(12) United States Patent
Mikami et al.

(10) Patent No.: US 8,098,824 B2
(45) Date of Patent: Jan. 17, 2012

(54) STORAGE APPARATUS AND DATA MANAGEMENT METHOD

(75) Inventors: Kyoko Mikami, Kawasaki (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1035 days.

(21) Appl. No.: 12/010,056

(22) Filed: Jan. 18, 2008

(65) Prior Publication Data
US 2009/0060195 A1  Mar. 5, 2009

(30) Foreign Application Priority Data
Sep. 5, 2007  (JP) .................... 2007-230537

(51) Int. Cl.
*H04L 9/00* (2006.01)
(52) U.S. Cl. .................................... 380/277
(58) Field of Classification Search .............. 380/277
See application file for complete search history.

(56) References Cited

U.S. PATENT DOCUMENTS

| | | | | |
|---|---|---|---|---|
| 2004/0105549 A1* | 6/2004 | Suzuki et al. | ......... | 380/278 |
| 2006/0064604 A1* | 3/2006 | Osaki | ......... | 713/193 |
| 2007/0168361 A1* | 7/2007 | Hirakawa et al. | ......... | 707/10 |
| 2008/0154987 A1* | 6/2008 | Kottomtharayil et al. | .... | 707/204 |

FOREIGN PATENT DOCUMENTS

| | | |
|---|---|---|
| EP | 1 494 120 A2 | 1/2005 |
| JP | 2005-018506 | 6/2003 |
| JP | 2005-303981 | 11/2004 |

OTHER PUBLICATIONS

Menezes, A. et al. "Handbook of Applied Cryptography" Chapter 13: Key Management Techniques, Jan. 1, 1996 (pp. 543-590).
Prabhakaran, V. et al. "Analysis and Evolution of Journaling File Systems" Proceedings of the General Track, 2005 USENIX Annual Technical Conference, Apr. 10-15, 2005 (pp. 105-120).

* cited by examiner

*Primary Examiner* — Jason Gee
(74) *Attorney, Agent, or Firm* — Volpe and Koenig, P.C.

(57) ABSTRACT

Provided is a storage system that includes a first storage apparatus and a second storage apparatus each connected to a host computer. The first and second storage apparatuses each include a controller and a disk drive. The controller manages an encryption status and an encryption key for each of a data volume and a journal volume in the disk drive. The controller in the first storage apparatus receives a write request from the host computer, creates a journal based on write data, encrypts the journal, and stores in an order the journal in a storage area in the journal volume. The controller in the order the encrypted journal stored in the journal volume, decrypts the journal, and transmits the decrypted journal to the second storage apparatus.

18 Claims, 26 Drawing Sheets

FIG.3

| COPY-SOURCE STORAGE APPARATUS IDENTIFIER | COPY-SOURCE DATA VOLUME IDENTIFIER | COPY-DESTINATION STORAGE APPARATUS IDENTIFIER | COPY-DESTINATION DATA VOLUME IDENTIFIER | GROUP IDENTIFIER |
|---|---|---|---|---|
| A | 001 | B | 001 | 1 |
| A | 002 | B | 002 | 1 |

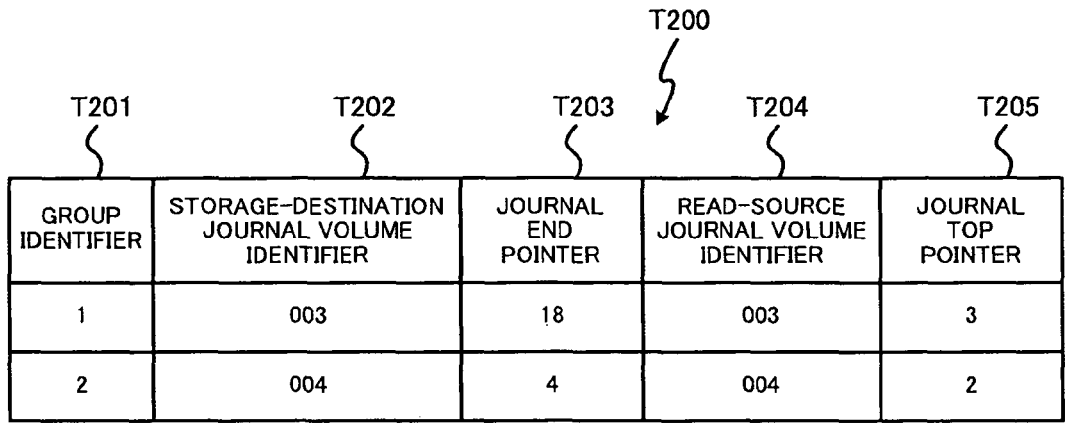
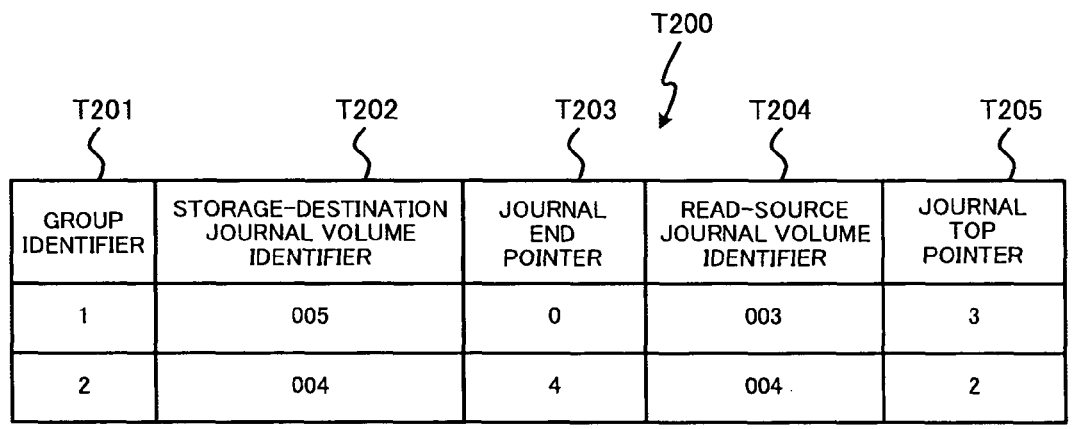
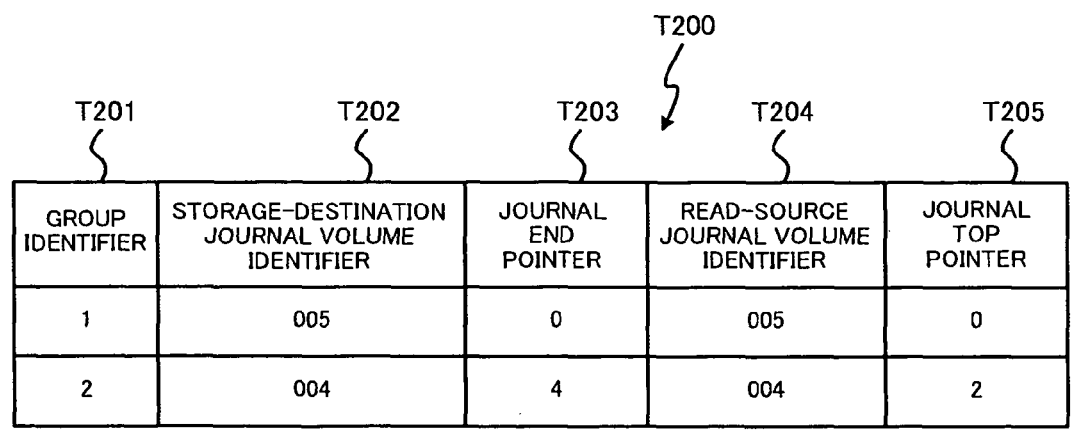

WHEN UN-TRANSFERRED JOURNAL EXISTS IN JOURNAL VOLUME:

WHEN NO UN-TRANSFERRED JOURNAL EXISTS IN JOURNAL VOLUME:

FIG.7

| JOURNAL VOLUME IDENTIFIER | ENCRYPTION KEY UPDATE STATUS | SWITCH POINTER |
|---|---|---|
| 003 | OFF | |
| 004 | OFF | |
| 005 | ON | 10 |

T401, T402, T400, T403

POINTERS IN OLD JOURNAL VOLUME IMMEDIATELY BEFORE ENCRYPTION KEY UPDATE COMMAND

POINTERS IN OLD JOURNAL VOLUME IMMEDIATELY AFTER ENCRYPTION KEY UPDATE COMMAND

POINTERS IN NEW JOURNAL VOLUME IMMEDIATELY AFTER ENCRYPTION KEY UPDATE COMMAND

POINTERS IN OLD JOURNAL VOLUME IMMEDIATELY BEFORE ENCRYPTION KEY UPDATE COMMAND

POINTERS IN OLD JOURNAL VOLUME IMMEDIATELY AFTER ENCRYPTION KEY UPDATE COMMAND

POINTERS IN NEW JOURNAL VOLUME IMMEDIATELY AFTER ENCRYPTION KE. _. _,.._ COMMAND

POINTERS IN JOURNAL VOLUME IMMEDIATELY BEFORE ENCRYPTION KEY UPDATE COMMAND

POINTERS IN JOURNAL VOLUME IMMEDIATELY AFTER ENCRYPTION KEY UPDATE COMMAND

POINTERS IN JOURNAL VOLUME THAT STORED JOURNAL IMMEDIATELY AFTER ENCRYPTION KEY UPDATE COMMAND

STORAGE APPARATUS AND DATA MANAGEMENT METHOD

CROSS-REFERENCES TO RELATED APPLICATIONS

This application relates to and claims priority from Japanese Patent Application No. JP2007-230537, filed on Sep. 5, 2007, the entire disclosure of which is incorporated herein by reference.

BACKGROUND

1. Field of the Invention

The invention relates generally to a storage apparatus and method of managing storage data using the same, and particularly to a remote copy technique for storage data using a journal between storage apparatuses having data encryption/decryption functions.

2. Description of Related Art

In order to prevent data loss caused by failures that occur in a storage apparatus in a computer system, data stored in a logical volume in the storage apparatus is normally backed up in another logical volume in a remote storage apparatus that is redundantly structured. For example, "remote copy" (or "remote mirroring") is known as a technique for backing up data in logical volumes. Specifically, in the remote copy, data is backed up by defining a logical volume in a primary storage apparatus (primary logical volume) and a logical volume in a secondary storage apparatus (secondary logical volume) as a pair of volumes, and copying data in the primary logical volume to the secondary logical volume, either as it is written to the primary logical volume, or at a later point in time. With such an arrangement, even if a failure occurs in the primary storage apparatus, the secondary storage apparatus can take over I/O access requests received from an application in a host computer.

Also, "journaling" is a well-known technique for increasing the speed of data backup/data restoration. In journaling, upon receipt of a data write request (command), data to be written and its meta data (e.g., time) is stored as a journal. In general, a logical volume for storing journals is referred to as a journal volume.

Document 1 (JP2005-18506 A) discloses a storage system using a journaling technique in the remote copy. Specifically, in reference 1, when a first storage system receives a write command for data in a certain one of its volumes, the first storage system updates the data in the volume, creates a journal by adding the receipt time to the write data, and transfers the created journal to a second storage system. The second storage system updates the data in its own volume based on the transferred journal. Accordingly, replication of the volume in the first storage system is created in the second storage system.

In terms of data security, data is often encrypted when it is stored in a storage apparatus. However, in old encrypted data that has been kept for a long time after the encryption, the encryption key and encryption algorithm used in the encryption might be weakened. In particular, since data of a certain type, such as e-mail data, is required to be stored for a long time due to government regulations, etc., these days, a technique for safely storing data for a long time is required.

Document 2 (JP2005-303981 A) discloses a storage system that encrypts data when storing it in order to ensure the confidentiality of the data. In addition, encrypted data is re-encrypted in accordance with a new and more robust encryption standard set in the storage system in reference 2. With such an arrangement, problems relating to the weakening of encryption keys or encryption algorithms can be avoided and data can be safely stored for a long time with its confidentiality intact.

In terms of data security, when data is encrypted or re-encrypted, since encryption/re-encryption processing applies a large load on a processor, system performance deteriorates. However, in the remote copy, a storage system is required to maintain high response performance to a write request from a host computer. Under such circumstances, a storage system that performs encryption/re-encryption causing a large processing load during remote copy has not been proposed.

In particular, the above storage system disclosed in cited document 2, in which the entire volume is re-encrypted and the load on the processor is accordingly large, could not be applied to a storage system using the remote copy technique.

It is therefore an object of this invention to propose a storage system and a data management method capable of performing efficient data backup while ensuring data security.

More specifically, the above object of this invention is to remote-copy data that requires encryption/decryption processing without lowering system performance.

In addition, the above object of this invention is to, even if an encryption key for a logical volume storing data has been updated, efficiently store encrypted data encrypted with the up-to-date encryption key in the logical volume, and also efficiently read the encrypted data from the logical volume and decrypt the encrypted data.

SUMMARY

In order to achieve the above object, this invention includes the below features defining the invention.

Provided according to an aspect of the invention is a storage system that includes a first storage apparatus operatively connected to a host computer; and a second storage apparatus operatively connected to the first storage apparatus. The first storage apparatus includes a first controller and a first disk drive controlled by the first controller, the first disk drive provided with a first data volume and a first journal volume. The first controller includes a first encryption management table for managing an encryption status and an encryption key for each of the first data volume and the first journal volume. When the first controller receives a write request from the host computer, the first controller creates a journal based on data accompanying the write request, encrypts the created journal in accordance with the encryption status and the encryption key for the first journal volume that are managed by the first encryption management table, stores the encrypted journal in an area in the first journal volume, reads and decrypts the encrypted journal stored in the first journal volume, and transmits the decrypted journal to the second storage apparatus. The first controller stores encrypted journals in a particular order in the first journal volume, and reads and decrypts in the order the encrypted journals were stored in the first journal volume.

According to another aspect, this invention can be regarded as a method invention. Specifically, provided according to another aspect of this invention is a data management method in a storage system that includes a first storage apparatus operatively connected to a host computer and a second storage apparatus operatively connected to the first storage apparatus. The method including steps performed by a first controller provided in the first storage apparatus, the steps being: forming a first data volume and a first journal volume in a first disk drive; forming, when receiving a write request from a host computer, a journal based on data accompanying the write request; encrypting the created journal based on an encryption status and an encryption key for the first journal volume that are managed by a first encryption management table, and storing the encrypted journal in the first journal volume; and decrypting the journal that has been encrypted based on the encryption status and the encryption key for the first journal volume that are managed by the first encryption management table and that has been stored in the first journal volume, and transmitting the decrypted journal to the second storage apparatus.

This invention can also be regarded as being an invention for a program that operates a storage apparatus to perform the above method.

According to the above aspects of this invention, data can be remote-copied with ensured data security and high system performance.

In addition, according to the above aspects of this invention, if an encryption key for a logical volume storing data has been updated, data encrypted with the up-to-date encryption key can be efficiently stored in the logical volume, and the encrypted data can be efficiently read from the logical volume and decrypted.

Other aspects and advantages of the invention will be apparent from the following description and the appended claims.

BRIEF DESCRIPTION OF THE DRAWINGS

FIG. 3 is a diagram explaining the structure of a pair management table in the storage apparatus according to an embodiment.

FIGS. 4A to 4C are diagrams explaining the structure of a journal volume management table in the storage apparatus according to an embodiment

FIG. 7 is a diagram explaining the structure of an encryption key update management table in the storage apparatus according to an embodiment.

DETAILED DESCRIPTION OF PREFERRED EMBODIMENTS

Embodiments of this invention will be described below with reference to the attached drawings.

First Embodiment

Figure 1:
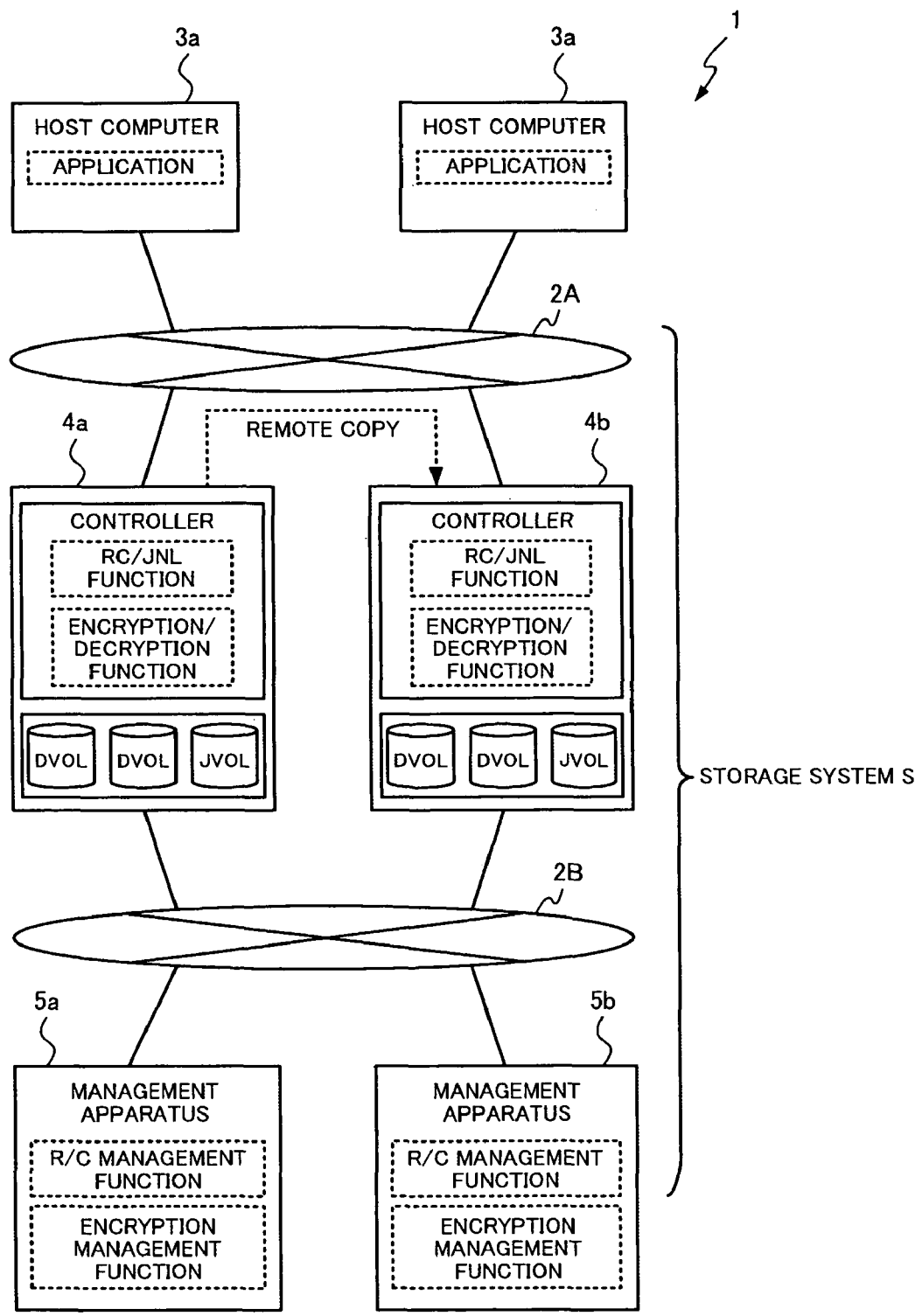
FIG. 1 is a diagram schematically showing the structure of a computer system according to an embodiment of this invention.

FIG. 1 is a diagram schematically showing the structure of a computer system according to an embodiment of this invention. As shown in FIG. 1, a computer system 1 includes a plurality of host computers 3 and a plurality of storage apparatuses 4 that are operatively connected to each other via a storage network 2A. The plurality of storage apparatuses 4 may also be regarded as one storage system S. The computer system 1 also includes management apparatuses 5 respectively operatively connected to each of the plurality of storage apparatuses 4 via a management network 2B. The computer 1 can be embodied in main systems for banks, seat reservation systems for airlines, etc.

The storage network 2A is a network system mainly used for communication based on I/O accesses between the host computers 3 and the storage apparatuses 4. The storage network 2A is also used for communication based on remote copy between storage apparatuses 4. The storage network 2A may be any of a LAN, the Internet and a SAN (Storage Area Network), and typically includes a network switch, a hub and the like. In this embodiment, the storage network 2A is a SAN (FC-SAN) with a fibre channel protocol base.

The management network 2B is a network used for communication when the management apparatuses 5 manage the host computers 3 and the storage apparatuses 4. In this embodiment, the management network 2B is a LAN with an IP protocol base, but this does not mean that the storage network 2A and the management network 2B are always provided as physically different networks. For example, if the storage network 2A is a network with an IP protocol base, both of the networks 2A and 2B may be formed within a common network system.

The host apparatus 3 is a core computer in a main system for a bank, a seat reservation system for an airline, etc. The host computer 3 includes hardware resources, such as a processor, a main memory, a network interface, and a local input/output device, and software resources, such as a device driver, an operating system (OS), and an application program. By this configuration, the host computer 3 executes various programs under the control of the processor and realizes desired processing by operating in cooperation with other hardware resources. Typically, by executing a business application program on the OS under the control of the processor, the host computer 3 accesses a logical unit or a logical volume (VOL: hereinafter simply referred to as a "volume") (to be described later in detail) in the storage apparatus 4, and realizes a desired business system. In this embodiment, two host computers 3a and 3b are shown, each of which accesses each of the storage apparatuses 4a and 4b.

The storage apparatus 4 is a subsystem for providing a data storage service to the host computer 3, and provides one or more volumes to the host computer 3 for this purpose. The storage apparatus 4 includes one or more disk drives 41 serving as a physical device(s) (PDEV) including a storage medium for carrying data; and a controller 42 that controls I/O access based on a write access or a read access for the disk drive 41.

The internal configurations of the storage apparatus 4a and the storage apparatus 4b are basically the same, but different roles are assigned to them during operation. Specifically, the storage apparatus 4a is a primary storage apparatus that works during normal operation, whereas the storage apparatus 4b is a secondary storage apparatus that stands by in case the primary storage apparatus 4a stops operating due to maintenance or the occurrence of a failure. Accordingly, the consistency of data in a pair of volumes in the primary storage apparatus 4a and the secondary storage apparatus 4b is maintained by remote copy (mirroring), which will be described later.

The volume is a "logical storage" that an application program in the host computer 3 can recognize. The volume is formed using one or more disk drives (physical devices) 41 under the control of the controller 42. In exemplary implementation, the volume is formed in one or more physical devices via a logical intermediate device. Specifically, in order to achieve large capacity and high reliability, a virtual device, which is referred to as a RAID group or an array group based on several physical devices, is defined using a RAID (Redundant Arrays of Independence Disks) technology. One or more logical devices or logical units are assigned to the virtual device, and a logical volume is assigned to each of these logical devices. In this specification, in order to make this invention easy to understand, one logical volume is assigned to one logical device, the logical intermediate device is omitted, and the logical volume is formed in a physical device.

A logical unit number (LUN) is assigned to each volume, so the host computer 3 can recognize a certain volume (i.e., logical device) using the logical unit number. The volume is divided into blocks each serving as the minimum unit of I/O access, and a logical block address (LBA) is assigned to each block. Thus, by providing the storage apparatus 4 with a logical address including a logical unit number and a logical block address, the host computer 3 can access a data set stored in a certain block in a certain volume.

The storage apparatus 4 is provided with various kinds of volumes depending on its purpose and application. In this embodiment, the storage apparatus 4 has one or more data volumes (D-VOL) for storing data based on I/O access from the host computer 3 and one or more journal volumes (J-VOL) for storing journal entries journals) resulting from journaling.

Journaling is one function provided in the storage apparatus 4 for rapidly backing up data. With the journaling function, when a write request is issued from the host computer 3, the storage apparatus 4 stores a journal including meta data related to the write request and data accompanying the write request. For example, the meta data includes: time information (time stamp) for when the write request is issued; an identifier (logical unit number) for a data volume that is specified in the write request; a group identifier for a group to which the relevant data volume belongs; a sequential number indicating the update order in the relevant group; the size of the data accompanying the write request; and the logical address for the storage area that will store the data accompanying the write access. The journal volume in this embodiment is also used as an intermediate buffer when remote copy is performed.

The remote copy is also a function provided in the storage apparatuses 4, where data is synchronously or asynchronously copied between volumes for which a pair relationship has been defined (pair volumes) without the intervention of the host computer 3 in order to duplex the data in the volumes. The remote copy function is realized by, for instance, a remote copy program installed in the storage apparatuses 4. When a new pair is defined between volumes in the storage apparatus 4a and the storage apparatus 4b, data is transferred, as an initial copy, from a volume in the primary storage apparatus 4a to a volume, which is a paired volume in the above newly-defined pair, in the secondary storage apparatus 4b.

In synchronous remote copy, the primary storage apparatus 4a that has received a write request from the host computer 3 stores data accompanying the write request in its own volume and transfers the data accompanying the write request to a volume, which is a paired volume in the defined pair relationship, in the secondary storage apparatus 4b, and when the data is stored in the secondary storage apparatus 4b receiving this data, the primary storage apparatus 4a reports the completion of processing to the host computer 3 in response to the write request.

In asynchronous remote copy, data is copied between a pair of volumes independently from (asynchronously to) a write request from the host computer 3. In this embodiment, the asynchronous copy, in which the secondary storage apparatus 4b issues a remote copy request to the primary storage apparatus 4a, is employed.

Also, journaling is used when performing the remote copy in this embodiment. In other words, the primary storage apparatus 4a transfers a journal to the secondary storage apparatus 4b in response to the remote copy request from the secondary storage apparatus 4b.

The storage apparatus 4a serves as a primary storage apparatus and the storage apparatus 4b serves as a secondary storage apparatus in this embodiment. However, the primary-secondary relationship may be defined on a volume basis, where the volumes in the storage apparatuses 4 may be divided into primary volumes and secondary volumes.

In addition, the storage apparatus 4 is provided with a volume encryption/decryption function. The encryption/decryption function is realized by an encryption/decryption program installed in the storage apparatus 4. When writing data in an encrypted volume, the storage apparatus 4 encrypts the data before writing.

The management apparatuses 5 are computers for managing the storage apparatuses 4, and general-use computers are typically adapted for the management apparatuses 5. Thus, the management apparatus 5 includes: hardware resources such as a processor, a main memory, a network interface and a local input/output device; and software resources such as a device driver, an OS and a management program. The management apparatus 5 provides a system administrator with a user interface for managing the storage apparatus 4 by executing various management programs on the OS under the control of the processor, and allows the system administrator to manage the storage apparatus 4 (e.g., setting, command execution and operation monitoring for the storage apparatus 4) based on the operation of the system administrator. For example, the management apparatus 5 configures settings for remote copy (e.g., defines a pair of volumes and executes initial copy) and settings for the encryption status of data volumes (validates/invalidates the encryption function) in accordance with directions from the system administrator.

Figure 2:
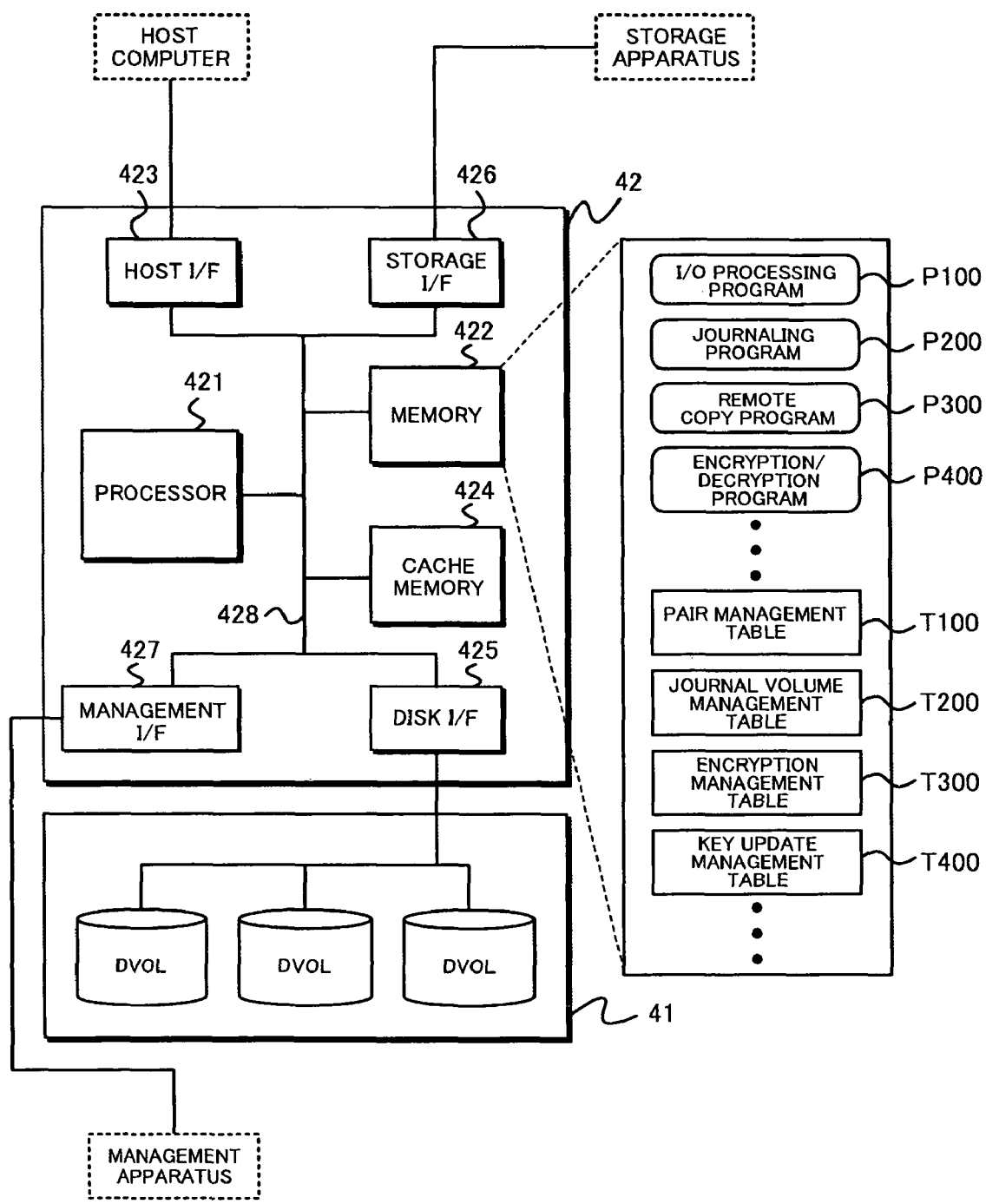
FIG. 2 is a diagram showing the structure of a storage apparatus according to an embodiment.

FIG. 2 shows the structure of the storage apparatus 4 according to the embodiment of this invention. As described above, the storage apparatus 4 includes one or more disk drives 41 and the controller 42 that controls the disk drive(s) 41. Each disk drive 41 is a physical device including a storage medium such as a hard disk drive and a flash memory. The disk drives 41 and the controller 42 are connected to each other via, for example, a disk channel.

As shown in FIG. 2, the controller 42 includes a processor 421, a memory 422, a host interface 423, a cache memory 424, a disk interface 425, a storage interface 426 and a management interface 427, with these components connected to each other via an internal data line 428. These components may each be multiplexed in a redundant configuration.

The processor 421 integrally controls the storage apparatus 4 by executing various programs stored in the memory 422, which serves as a main memory for the processor 421. The memory 422 stores, among others, an I/O processing program P100, a journaling program P200, a remote copy program P300, and an encryption/decryption program P400. The I/O processing program P100 integrally controls I/O access based on write requests and read requests from the host computer 3 to realize the data storage service of the storage apparatus 4. The journaling program 200 creates, when a write request is issued from the host computer 3, a journal entry journal) based on data accompanying the write request. The remote copy program P300 realizes remote copy processing between the storage apparatuses 4. The remote copy program P300 includes a subprogram for a remote copy request requester and a subprogram for a remote copy request receiver. The encryption/decryption program P400 encrypts data to be stored in a volume in the disk drive 41 and decrypts the encrypted data when this data is read.

The memory 422 also stores system configuration information and cache directory information including a pair management table T100, a journal volume management table T200, an encryption management table T300 and an encryption key update management table. Some or all of these programs and tables are loaded to the memory 422 as appropriate from an auxiliary storage apparatus (not shown) under the control of the processor 421 so that the processor 421 can use them. In addition, the management apparatus 5 acquires the system configuration information stored in the memory 422 and provides the system configuration information to the system administrator via the user interface.

The host interface 423 is a system circuit that includes a protocol device (not shown) and provides communication between the storage apparatus 4 and the host computer 3 connected via the storage network 2A. The protocol device includes a processor for performing protocol processing depending on an individual protocol. When receiving a write request from the host computer 3 for example, the host interface 423 writes data accompanying the write request to the cache memory 424 under the control of the processor 421.

The cache memory 424 is a memory module that temporarily stores (caches) data handled between the host computer 3 and the disk drive 41. In other words, the cache memory 424 is used for data passing between the host interface 423 and the disk interface 425. Examples of the cache memory 424 includes D-RAMs, which is known as volatile memory, and flash RAMs, which is known as nonvolatile memory.

The disk interface 425 retrieves data stored in the cache memory 424, stores the data in the disk drive 41 (destaging), and retrieves data from the disk drive 41 and writes the data in the cache memory 424 (staging). For example, if a read request is received from the host computer 3 but the requested data does not exist in the cache memory 424, the disk interface 425 performs destaging as needed to secure a cache area and then stages the requested data to the cache memory 424.

The storage interface 426 is a system circuit that includes a protocol device (not shown) like the host interface 423, and provides communication between one storage apparatus 4 and another storage apparatus 4 connected via the storage network 2A. For example, during the remote copy between the storage apparatuses 4, data is transferred via the storage interface 426.

The management interface 427 is also a system circuit that includes a protocol device (not shown), and provides communication between the storage apparatus 4 and the management apparatus 5 connected via the management network 2B. If the management network 2B is configured by a LAN with a TCP/IP base, the management interface 427 can use an Ethernet (registered trademark) board.

FIG. 3 is a diagram for explaining the structure of the pair management table T100 in the storage apparatus 4 according to the embodiment of this invention. The pair management table T100 manages the pair relationships for data volumes between which remote copy is performed. The pair management table T100 is created and updated by a system administrator operating the management apparatus 5.

As shown in FIG. 3, each entry in the pair management table T100 includes a copy-source storage apparatus identifier field T101, a copy-source data volume identifier field T102, a copy-destination storage apparatus identifier field T103, a copy-destination data volume identifier field T104 and a group identifier field T105.

Entered in the copy-source storage apparatus identifier field T101 is a storage apparatus identifier for identifying a storage apparatus having a data volume as a copy target. The storage apparatus identifier may be the vender name, or the manufacture number or similar of the storage apparatus 4.

Entered in the copy-source data volume identifier field T102 is a volume identifier for identifying a data volume as a copy target. The volume identifier may have any configuration as long as it can uniquely identify a certain volume from volumes in the storage apparatus identified by the copy-source storage apparatus identifier. For example, a logical unit number may be used as the volume identifier. In other words, the volume identifier is uniquely assigned to each volume regardless of the type of the volume (i.e., regardless of whether the volume is a data volume or a journal volume).

Entered in the copy-destination storage apparatus identifier field T103 is a storage apparatus identifier for identifying a storage apparatus having a data volume that stores copied data.

Entered in the copy-destination data volume identifier field T104 is a volume identifier for identifying a data volume that stores copied data. The copy-destination data volume identifier also may be any identifier as long as it can uniquely identify a certain data volume from data volumes included in the storage apparatus identified by the copy-destination storage apparatus identifier.

Entered in the group identifier field T105 is a group identifier for identifying the group to which data volumes in each entry belong. The group identifier manages one or more data volumes (and one or more data volumes that have been defined as paired volumes) by a unit of group in order to ensure a data update order. One group sometimes includes a plurality of data volumes, and in such a configuration, the data volumes share one journal volume. In other words, a group is defined for one or more data volumes so that the data update order for some data volumes in the copy-source storage apparatus 4 is ensured for the corresponding data volumes in the copy-destination storage apparatus 4 during the remote copy. A unique update number is assigned in the order of data update in the same group.

FIGS. 4A to 4C are diagrams each explaining the structure of the journal volume management table T200 in the storage apparatus 4 according to the embodiment of this invention. The journal volume management table T200 is a table for managing the journal volume that stores journals.

As shown in FIGS. 4A to 4C, each entry in the journal volume management table includes a group identifier field T201, a storage-destination journal volume identifier field T202, a journal end pointer field T203, a read-source journal volume identifier field T204 and a journal top pointer field T205.

The group identifier for identifying the above-described group is entered in the group identifier field T201. Namely, journals that are created based on write requests for one or more volumes that belong to a common group are stored in the journal volume that belongs to this group.

Entered in the storage-destination journal volume identifier field T202 is—if a data volume that belongs to the group identified by a group identifier is updated—a volume identifier that identifies the journal volume that stores the relevant journal.

Entered in the journal end pointer field T203 is the address next to the end address of the storage area that stores the journal that has been created most recently. In short, the end journal pointer indicates a storage area location in which a journal will be stored next.

Entered in the read-source journal volume identifier field T204 is a volume identifier for identifying a journal volume from which a journal is read. Entered in the journal top pointer field T205 is the top address of a storage area that stores the oldest journal in journals that have not yet been transferred. In short, the journal top pointer indicates a storage area location from which a journal will be read next.

Figure 5A:
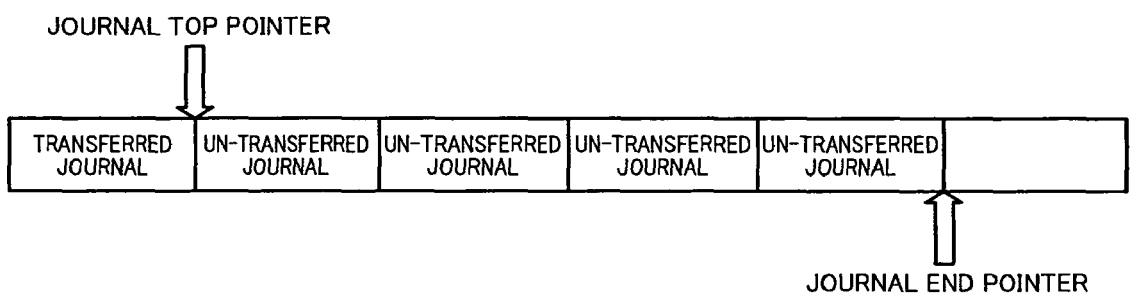
FIGS. 5A and 5B are diagrams explaining the relationship between a journal top pointer and a journal end pointer for a journal volume in the storage apparatus according to an embodiment.
Figure 5B:
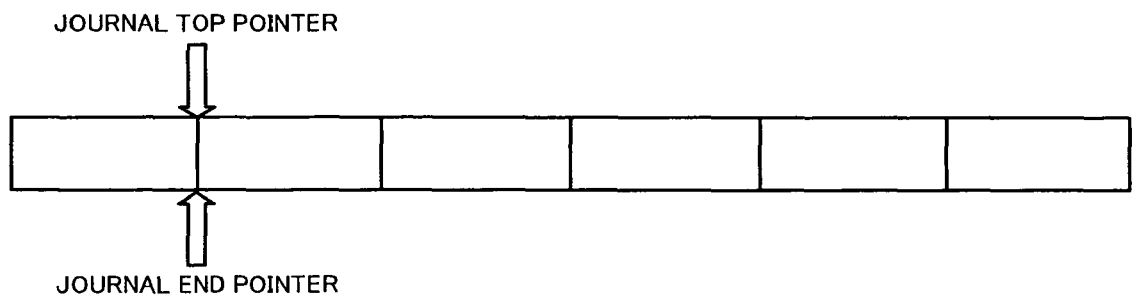

FIGS. 5A and 5B are diagrams each showing the relationship between a journal top pointer and a journal end pointer for a journal volume in the storage apparatus 4 according to the embodiment of this invention.

Specifically, as shown in FIG. 5A, the journal top pointer indicates the top address of the storage areas that store un-transferred journals in journals stored in the journal volume. The journal end pointer indicates the address next to the end address of the storage areas that stores the un-transferred journals in the journals stored in the journal volume.

If there is no un-transferred journal in the journal volume, the addresses indicated by the journal top pointer and the journal end pointer match with each other as shown in FIG. 5B. Accordingly, by comparing the journal top pointer with the journal end pointer, whether or not there is an un-transferred journal in the journal volume can be determined.

A journal is created every time a write request is received, and journals are sequentially stored from the top storage area in the journal volume in accordance with the journal end pointer. When the journal end pointer comes to the end address of the storage areas in the journal volume, the journal end pointer returns to the top address of the storage areas.

Figure 6:
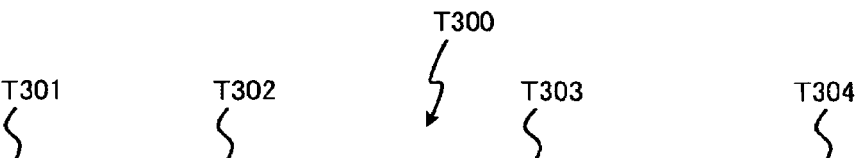
FIG. 6 is a diagram explaining the structure of an encryption management table in the storage apparatus according to an embodiment.

FIG. 6 is a diagram for explaining the structure of the encryption management table T300 in the storage apparatus 4 according to the embodiment of this invention. The encryption management table T300 manages the encryption statuses of volumes (i.e., the data volumes and journal volume) in the storage apparatus 4.

As shown in FIG. 6, an entry in the encryption management able T300 includes a volume identifier field T301, an encryption status field T302, an encryption key field T303 and a key update time field T304.

A volume identifier for identifying a volume is entered in the volume identifier field T301.

Entered in the encryption status field T302 is a flag indicating whether or not the volume identified by the volume identifier has been encrypted. The encryption status is indicated as "ON" if the volume has been encrypted and "OFF" if the volume has not been encrypted.

If the encryption status is "ON," an encryption key for encrypting/decrypting the relevant volume is entered in the encryption key field T303. The encryption key is updated in accordance with a command from the system administrator operating the management apparatus 5. The encryption key is formed by a value (e.g., 128-bit value) used in a predetermined encryption/decryption algorithm. Encryption and decryption are in a complementary relationship, so the "encryption key" in this specification also means the decryption key. Also, a volume being encrypted indicates a state in which data in the encrypted volume cannot be used in a meaningful way without the use of the encryption key (decryption key), and typically means the state in which data that has been encrypted with the encryption key is being stored in the volume.

It is noted that when the encryption status of a certain volume is set to "ON," the encryption status of a volume associated with the certain volume may automatically be set to "ON." For example, when the system administrator sets the encryption status of a data volume to "ON" via the user interface in the management apparatus 5, the management program in the management apparatus 5 identifies the journal volume associated with this data volume and automatically sets the encryption status of the identified journal volume to "ON".

In addition, a common encryption key may be used for a plurality of volumes. For example, a common encryption key may be used for data volumes that belong to a common group, or a common key may be used for journal volumes corresponding to a data volume.

Entered in the key update time field T304 is the time when the encryption key entered in the encryption key field T303 is updated to a new one. The use of an encryption key that has not been updated for a long time is not preferable in terms of security, so the system administrator operates the management apparatus 5 to order the creation of a new encryption key, and the time when the new encryption key is created in response to this command is entered in the key update time field T304.

FIG. 7 is a diagram explaining the structure of the encryption key update management table T400 in the storage apparatus 4 according to the embodiment of this invention. The encryption key update management table T400 manages the update status of an encryption key used for a journal volume.

As shown in FIG. 7, each entry in the encryption key update management table T400 includes a journal volume identifier field T401, a key update status field T402 and a switch pointer field T403.

A volume identifier for identifying a journal volume in the storage apparatus 4 is entered in the journal volume identifier field T401.

Entered in the encryption key update status field T402 is a flag indicating whether or not an encryption key used for the journal volume identified by the journal volume identifier has been updated. The encryption status is indicated as "ON" for the journal volume for which the encryption key has been updated, and "OFF" for the journal volume for which the encryption key has not been updated.

Entered in the switch pointer field T403 is a switch pointer, which is, if the encryption key update status is "ON," the address shown in the journal end pointer field T203 in the corresponding entry in the journal volume management table T200 shown in FIG. 4 as of when the update of the encryption key was commanded. In other words, the switch pointer is a pointer for switching areas in the journal volume based on the encryption key update command.

Figure 8:
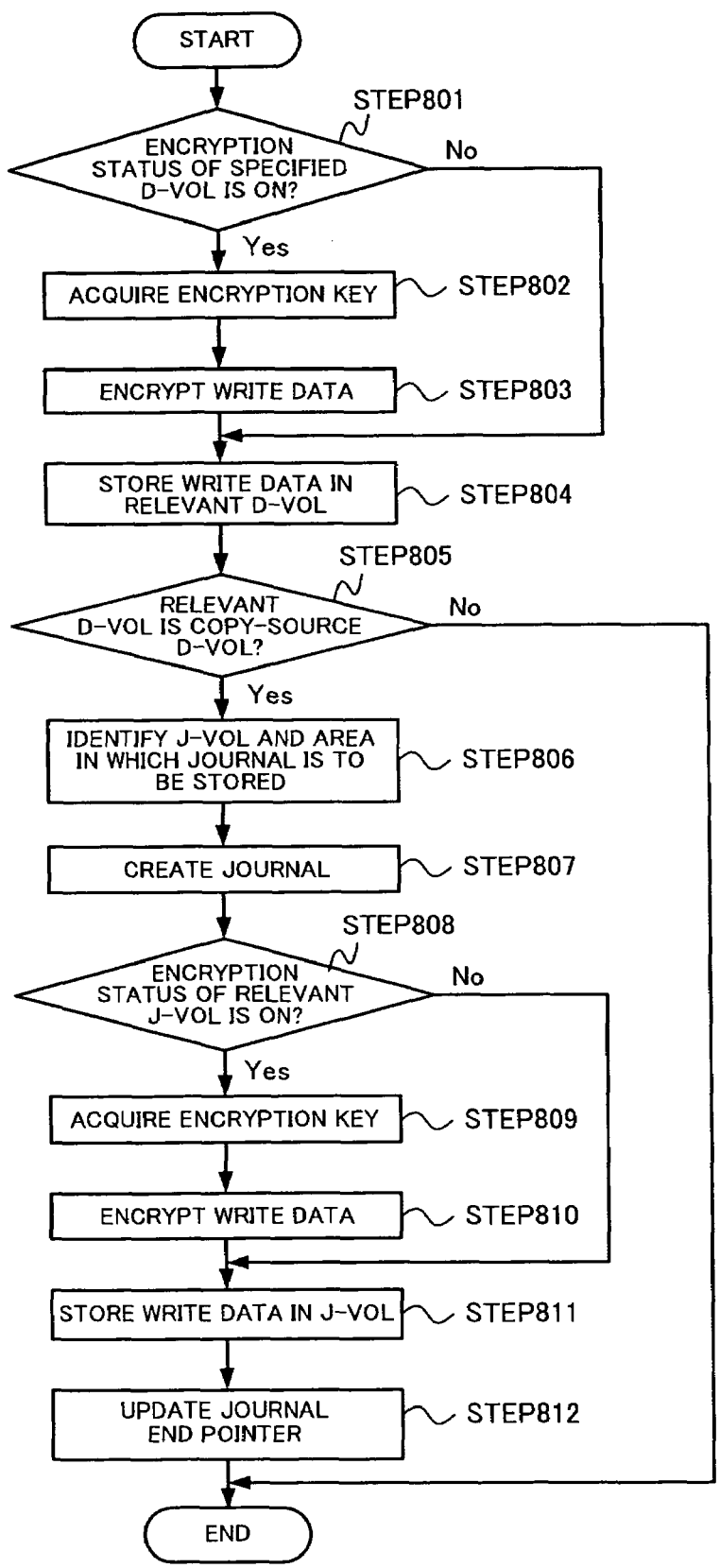
FIG. 8 is a flowchart explaining processing based on a write request in the storage apparatus according to an embodiment.

FIG. 8 is a flowchart for explaining processing based on a write request in the storage apparatus 4 according to the embodiment of this invention. Specifically, FIG. 8 explains how the primary storage apparatus 4a operates when the primary storage apparatus 4a receives from the host computer 3a a write command for a data volume. The processing based on the write request is performed as a result of cooperation between the components under the control of the processor 421 in the controller 42.

Specifically, when receiving a write command from the host computer 3a, the controller 42 in the storage apparatus 4a (hereinafter referred to as a "controller 42a") refers to the encryption management table T300 stored in the memory 422 and judges whether or not the encryption status of the data volume (D-VOL) specified by the write command is "ON," namely, whether or not the data volume has been encrypted (Step 801).

If the encryption status of the data volume is judged as being "ON," i.e., the data volume has been encrypted (Step 801: Yes), the controller 42a refers to the encryption management table T300 and acquires an encryption key for the relevant data volume (Step 802). Next, the controller 42a encrypts data accompanying the write command using the acquired encryption key based on a predetermined encryption algorithm (Step 803), and stores the encrypted data in the relevant data volume (Step 804). To be more specific, the processor 421 encrypts data written in the cache memory 424 using the encryption key based on a predetermined encryption algorithm, and then re-writes the data in the cache memory 424. Accordingly, the encrypted data in the cache memory 422 is destaged at an appropriate time by the disk interface 425 in accordance with cache directory information in the memory 422. Alternatively, the controller 42a may encrypt the data in the cache memory 424 when it is destaged to the disk drive 41 without returning the encrypted data to the cache memory 424.

On the other hand, if it is judged that the data volume specified in the write command has not been encrypted (Step 801: No), the controller 42a stores the data accompanying the write command as it is (without encrypting it) in the relevant data volume (Step 804).

The controller 42a then refers to the pair management table T100 and judges whether or not the data volume specified in the write command has been set as being a copy-source data volume (Step 805). If it is determined that the data volume has not been set as being the copy-source data volume (Step 805: No), the controller 42a ends the processing resulting from the write command. In this case, the controller 42a transmits a completion status to the host computer 3a that issued that write command.

If it is judged that the data volume has been set as being the copy-source data volume (Step 805: Yes), the controller 42a refers to the journal management table T200 and acquires the volume identifier entered in the storage-destination journal volume identifier field T202 and the journal end pointer entered in the journal end pointer field T203 (Step 808) In short, the controller 42a identifies the journal volume in which a journal based on the write command is to be stored and the top address of its storage area. Next, the controller 42a creates a journal based on the write command (Step 807). The journal includes meta data and write data, as mentioned earlier. An example of the meta data includes: time information about the time when the write command was issued; a volume identifier for the data volume specified in the write command; a group identifier for the group to which the data volume belongs; a sequential number showing the update order in the group; the size of the data accompanying the write command; and an address for the storage area in the journal volume that stores the data accompanying the write command.

The controller 42a refers to the encryption management table T300 and judges whether or not the encryption status of the journal volume in which the created journal is to be stored is "ON" (Step: 808). If the encryption status of the journal volume in which the journal is to be stored is determined as being "ON" (Step 808: Yes), the controller 42a refers to the encryption management table T300 and acquires an encryption key assigned to this journal volume (Step 809). Then, the controller 42a encrypts the journal using the acquired encryption key and according to a predetermined encryption algorithm (Step 810) and stores the encrypted journal in the relevant journal volume (Step 811).

If the encryption status of the journal volume in which the journal is to be stored is judged as being not "ON" (Step 808: No), the controller 42a stores the journal as it is (without encrypting it) in the relevant journal volume (Step 811).

Then the controller 42a updates the journal end pointer field T203 in the relevant entry in the journal volume management table T200 (Step 812). In other words, the controller 42a sets the journal end pointer to the address next to the end address of the journal volume area in which the created journal has been stored.

With the above operation, the controller 42a terminates the processing in response to the write command. In this case, the controller 42a typically transmits a completion status to the host computer 3a that has issued the write command.

Although the controller 42*a* performs the storage processing for a journal in a journal volume synchronously with the storage processing for writing data in the data volume in the flowchart shown in FIG. 8, the arrangement is not limited to that situation. The controller 42*a* may perform the storage processing for a data volume asynchronously.

Figure 9:
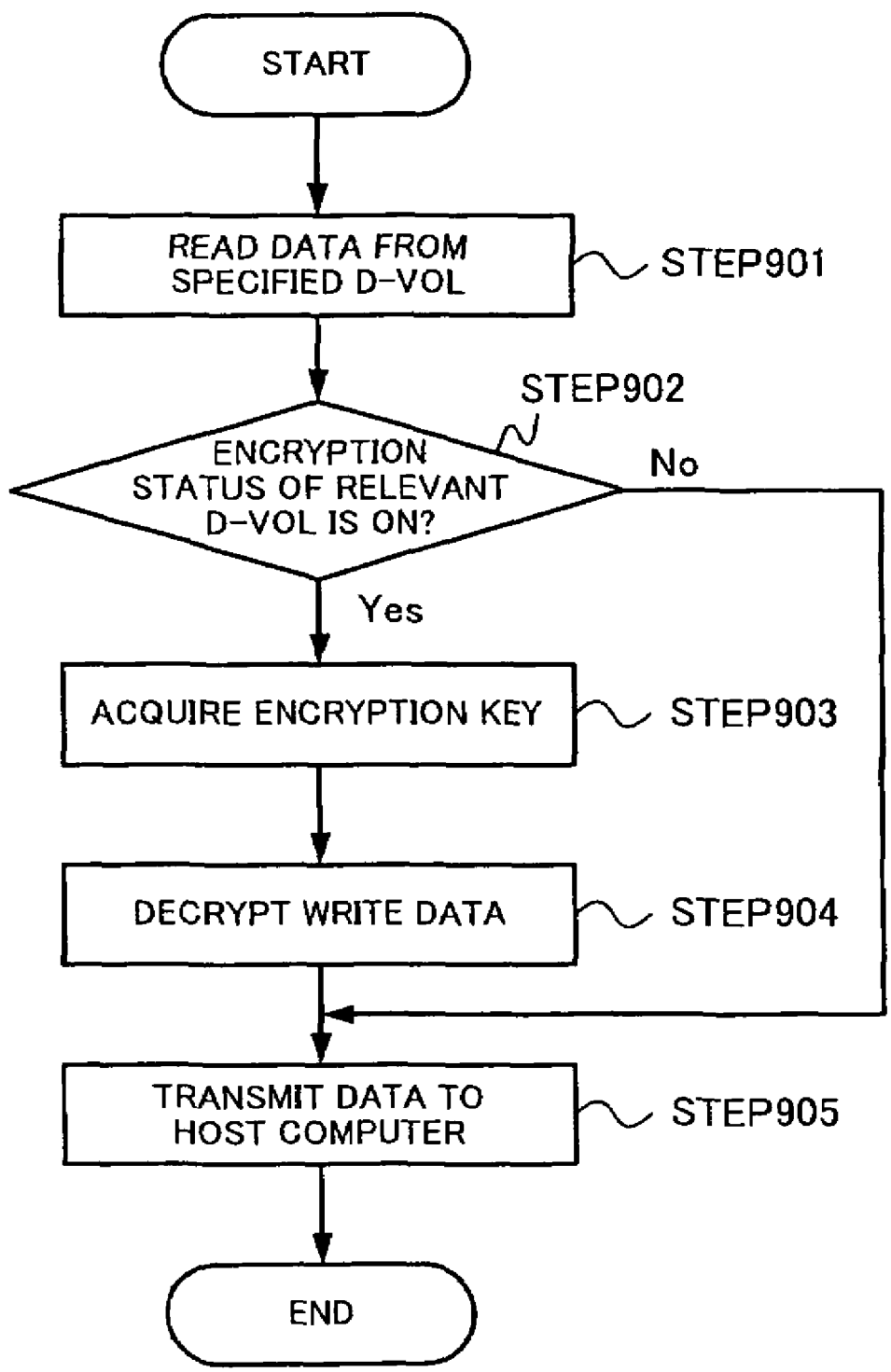
FIG. 9 is a flowchart explaining processing based on a read request in the storage apparatus according to an embodiment.

FIG. 9 is a flowchart for explaining the processing in response to a read command in the storage apparatus 4 according to the embodiment of this invention. Specifically, FIG. 9 illustrates the operation of the primary storage apparatus 4*a* when the primary storage apparatus 4*a* receives a read command for a data volume from the host computer 3*a*. The processing in response to the read command is performed as a result of cooperation between the components under the control of the processor 421 in the controller 42.

Specifically, when receiving a data read command from the host computer 3*a*, the controller 42*a* in the storage apparatus 4*a* reads data from a data volume specified in the read command (Step 901). To be more specific, if the processor 421 judges that the data specified by the read command does not exist in the cache memory, the processor 421 controls the disk interface 42 to stage the relevant data. Accordingly, the read data is written to the cache memory 424 in an encrypted state. Alternatively, the controller 42*a* may decrypt the data when the data is staged from the disk drive 41 in order to avoid the mixed existence of encrypted data and unencrypted data in the cache memory 424.

Next, the controller 42*a* refers to the encryption management table T300 stored in the memory 422 and judges whether or not the encryption status of the data volume specified in the read command is "ON" (Step 902). If the encryption status of the data volume specified in the read command is determined as being "ON" (Step 902: Yes), the controller 42*a* acquires an encryption key assigned to this data volume (Step 903). The controller 42*a* then decrypts the relevant read data using the acquired encryption key and according to a predetermined decryption algorithm (Step 904). Accordingly, the controller 42*a* transmits the decrypted data to the host computer 3*a* in response to the read command (Step 905) and terminates the processing.

On the other hand, if the encryption status of the data volume specified in the read command is determined as being not "ON" (Step 902: No), the controller 42*a* transmits to the host computer 3*a* the data read from this data volume as it is in response to the read command (Step 905), and terminates the processing.

Figure 10:
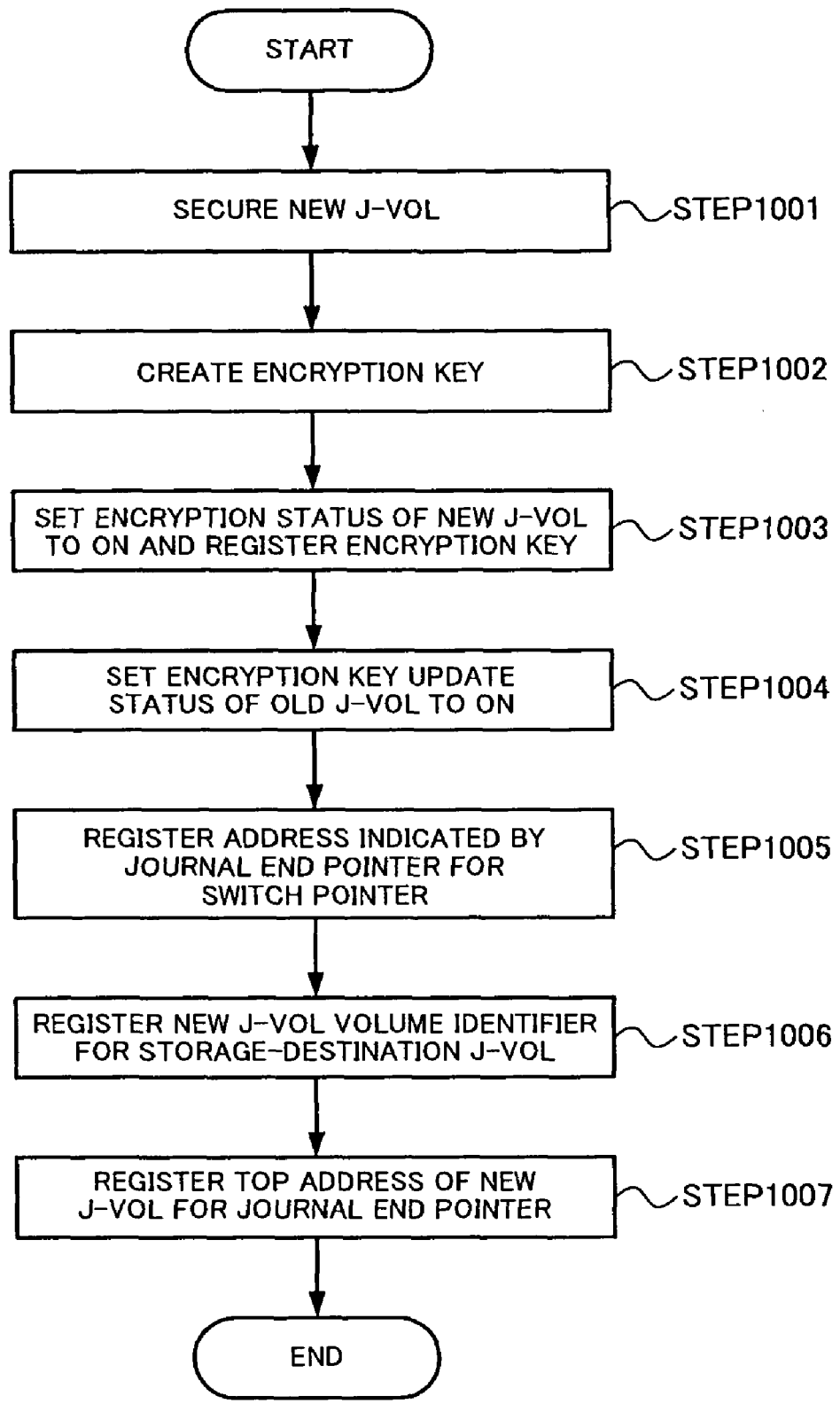
FIG. 10 is a flowchart explaining encryption key update processing in the storage apparatus according to an embodiment.

FIG. 10 is a flowchart for explaining encryption key update processing in the storage apparatus 4 according to the embodiment in this invention. Specifically, FIG. 10 illustrates the operation of the storage apparatus 4*a* when the storage apparatus 4*a* receives an encryption key update request (which corresponds to an "encryption key update command" to be described below) from the management apparatus 5*a*. Note the following description also applies to the situation where the storage apparatus 4*b* receives the encryption key update command from the management apparatus 5*b*.

When a system administrator operates the management apparatus 5*a* to command the storage apparatus 4*a* to update an encryption key, the management apparatus 5*a* transmits an encryption key update command to the storage apparatus 4*a*. The encryption key update command includes: a volume identifier for identifying a journal volume as an encryption update target (hereinafter referred to as an "old journal volume"); and the issue time of the encryption key update command.

When receiving the encryption key update command from the management apparatus 5*a* via the management network 2B, the controller 42*a* in the storage apparatus 4*a* secures another new journal volume (hereinafter referred to as a "new journal volume") in the disk drive 41 (Step 1001). Typically, the controller 42*a* creates a new journal volume in the disk drive 41. A new volume identifier is assigned to the new journal volume.

Next, the controller 42*a* creates a new encryption key using the issue time, a random number function or similar and according to a predetermined encryption key creation algorithm (Step 1002), and updates the encryption management table T300 stored in the memory 422 (Step 1003). Specifically, the controller 42*a* sets "ON" in the encryption status field T302 in the relevant entry in the encryption management table T300 and enters the created encryption key in the encryption key field T303.

The controller 42*a* then sets "ON" in the encryption key update status field T402 in the relevant entry (i.e., the entry including the old journal volume) in the encryption key update management table T400 (Step 1004). Further, the controller 42*a* enters the address, which has been entered in the journal end pointer field T203 in the relevant entry in the journal volume management table T200, in the switch pointer field T403 in the corresponding entry in the encryption key update management table T400 (Step 1005).

The controller 42*a* then refers to the journal volume management table T200, extracts an entry that includes a storage-destination journal volume identifier field T201 indicating the old journal volume, and enters the volume identifier of the new journal volume in the storage-destination journal volume identifier field T201 in the extracted entry (Step 1006). In short, the storage-destination journal volume is shifted from the old journal volume to the new journal volume. The controller 42*a* enters the top address of the new journal volume storage area in the journal end pointer field T203 in the relevant entry in the journal volume management table T200 (Step 1007).

For example, as shown in FIG. 4B, if the volume identifier of the old journal is "003" and the identifier "005" is assigned to the new journal volume, "003" in the storage-destination journal volume identifier field T202 in the journal volume management table T200 is replaced by "005," and the top address "0" is entered in the journal end pointer field T203.

Figure 11A:
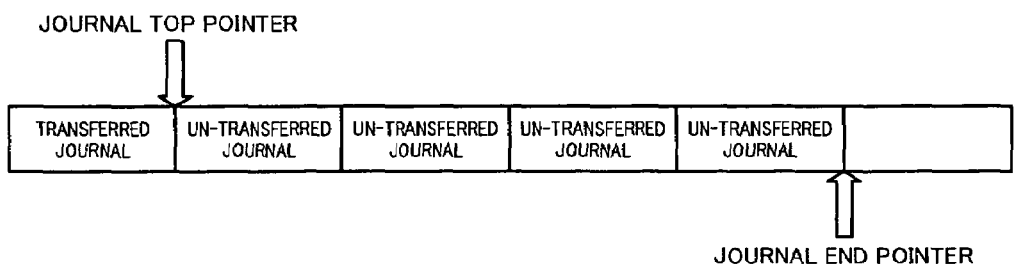
FIGS. 11A to 11C are diagrams explaining a relationship between an old journal volume and a new journal volume in the storage apparatus according to an embodiment.
Figure 11B:
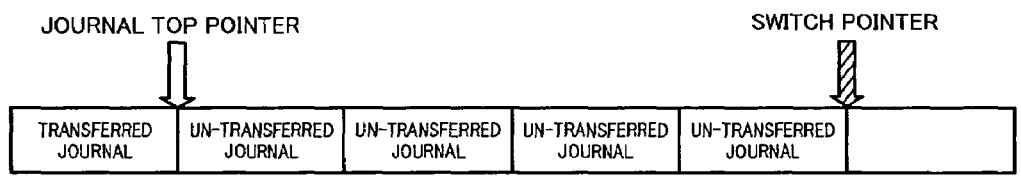
Figure 11C:
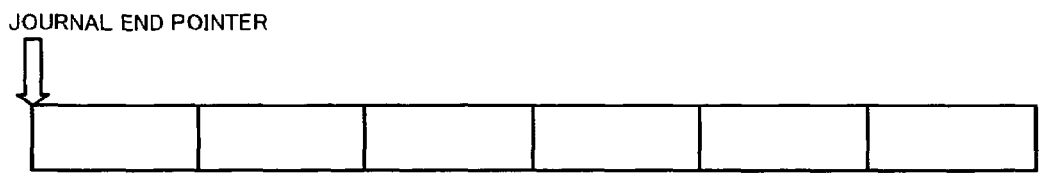

Suppose the old journal volume is in the state shown in FIG. 11A immediately before an encryption key update command is issued. When the storage apparatus 4 receives the encryption key update command from the management apparatus 5 and performs the processing sequence described above, the old journal volume and the new journal volume will be changed to the states respectively shown in FIGS. 11B and 11C. In short, the journal end pointer in the old journal volume is replaced by the switch pointer (FIG. 11B), and the journal end pointer is set in the new journal volume. In the state immediately after the reception and execution of the encryption key update command, where a write command has not been received, the journal end pointer serves as the top address of unused storage areas in the new journal volume.

Figure 12:
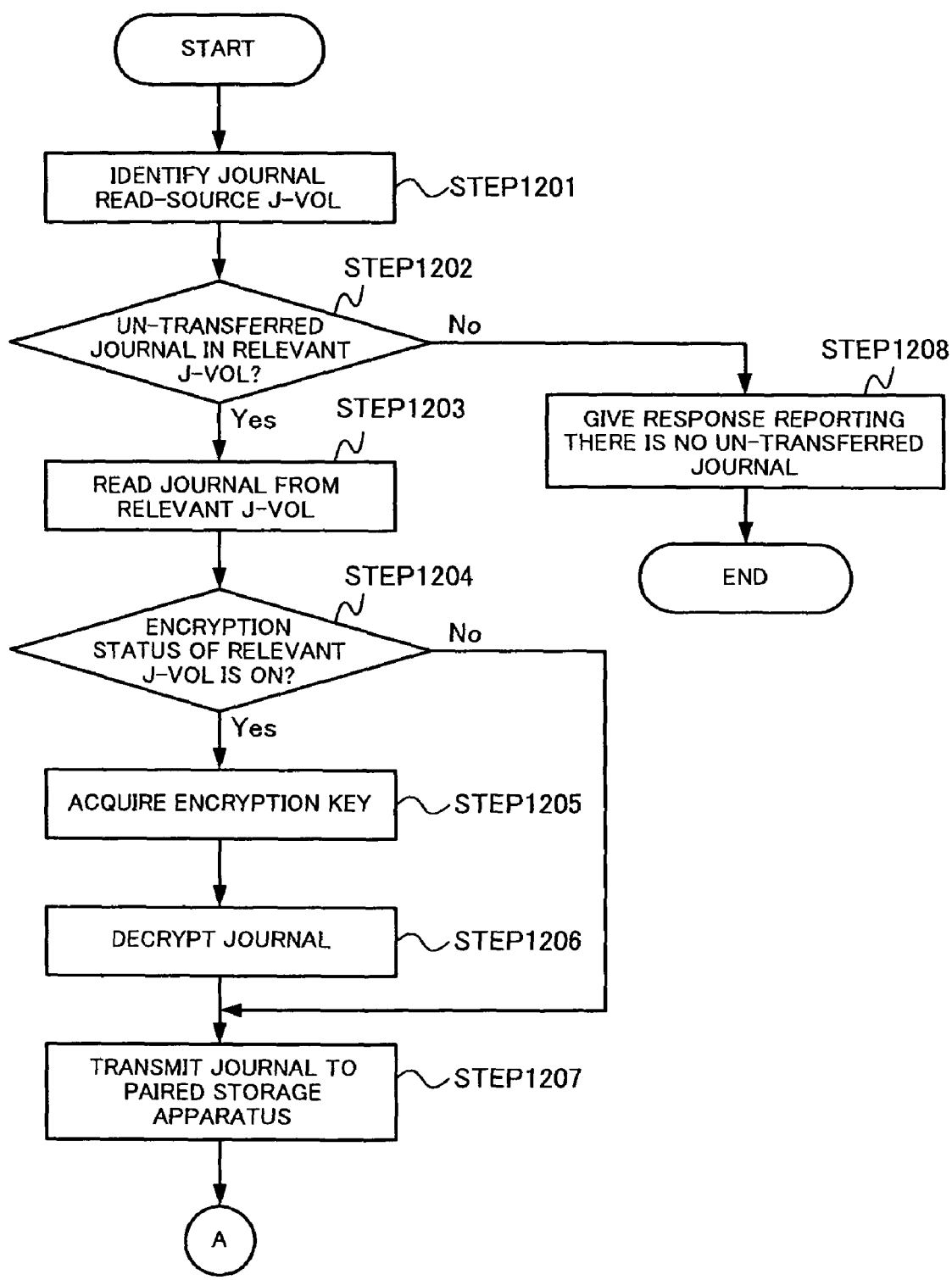
FIG. 12 is a flowchart explaining remote copy processing in a copy-source storage apparatus in a storage system according to an embodiment.
Figure 13:
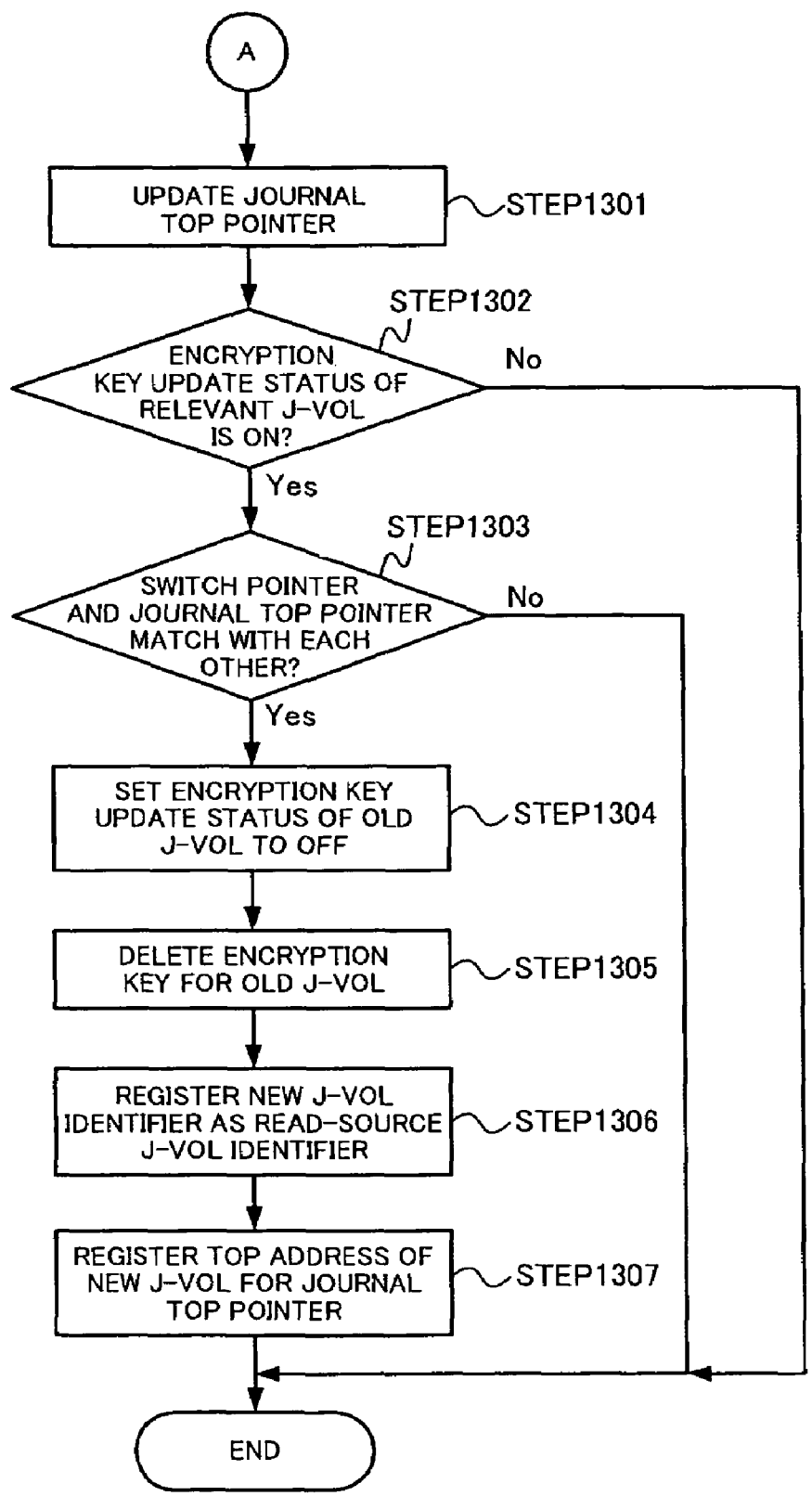
FIG. 13 is a flowchart explaining the remote copy processing in the copy-source storage apparatus in the storage system according to an embodiment.

FIGS. 12 and 13 are flowcharts each explaining remote copy processing in the storage system according to the embodiment of this invention. Specifically, FIGS. 12 and 13 explain the operation of the storage apparatus 4*a* when the storage apparatus 4*a* receives a remote copy request (which corresponds to a journal read command to be described below) from the storage apparatus 4*b*.

In normal operation, the storage apparatus 4*a* provides a data storage service for the host computer 3*a* and performs transmission-side remote copy processing in response to a remote copy request from the storage apparatus 4*b*.

First, referring to FIG. 12, when the controller 42a in the storage apparatus 4a receives a journal read command from the storage apparatus 4b which has a paired volume, the storage apparatus 4a refers to the journal volume management table T200, extracts the relevant entry based on a group identifier contained in the journal read command, and extracts the volume identifier entered in the read-source journal volume identifier field T204 in the relevant entry (Step 1201). In short, the controller 42a identifies the journal volume that stores the journal to be transmitted to the storage apparatus 4b (i.e., read-source journal volume). Then, the controller 42a judges whether the address journal end pointer) shown in the journal end pointer field T203 and the address (journal top pointer) shown in the journal top pointer field T205 in the relevant entry match with each other, in order to check for the existence of a un-transmitted journal stored in the read-source journal volume (Step 1202).

If it is judged that the journal end pointer and the journal top pointer match with each other, i.e., there is no un-transmitted journal (Step 1202: No), the controller 42a transmits to the controller in the storage apparatus 4b a response reporting that there is no journal to be transmitted (Step 1208), and terminates the transmission-side remote copy processing.

On the other hand, if it is judged that the journal end pointer and the journal top pointer do not match with each other, i.e., there is an un-transmitted journal (Step 1202: Yes), the controller 42a sequentially reads journals from the storage area in the read-source journal volume based on the journal top pointer (Step 1203).

Next, the controller 42a refers to the encryption management table T300 and judges whether or not the encryption status of the read-source journal volume is "ON" (Step 1204). If the encryption status of the read-source journal volume is judged as being not "ON" (Step 1204: No), the controller 42a transmits the read journal as it is to the storage apparatus 4b (Step 1207).

On the other hand, if the encryption status of the read-source journal volume is determined as being "ON" (Step 1204: Yes), the controller 42a refers to the encryption management table T300 and acquires an encryption key that has been assigned to the read-source journal volume (Step 1205). Then, the controller 42a decrypts the read journal using the acquired encryption key and according to a predetermined decryption algorithm (Step 1206), and transmits the decrypted journal to the storage apparatus 4b (Step 1207).

The controller 42a updates the journal top pointer field in the relevant entry in the journal volume management table T200 in accordance with the data size of the read and transferred journal (Step 1301 in FIG. 13). In other words, the top address of the storage area of the relevant read-source journal volume storing an un-transmitted journal is entered in the journal top pointer field.

Next, the controller 42a refers to the encryption key update management table T400 and judges whether or not the encryption key update status of the relevant read-source journal volume is "ON" (Step 1302). In other words, the controller 42a judges whether or not there is a newly created journal volume resulting from the update of the encryption key, and checks the existence of the switch pointer. If the encryption key update status is judged as being not "ON," i.e., there is no new journal volume (Step 1302: No), the controller 42a terminates the transmission-side remote copy processing. When receiving a journal read command next time, the controller 42a performs the above-described processing to transmit journals from the journal indicated by the journal top pointer.

On the other hand, if the encryption key update status is judged as being "ON", i.e., there is a new journal volume (Step 1302: No), the controller 42a then judges whether or not the address (switch pointer) shown in the switch pointer field T403 in the encryption key management update table T400 and the address journal top pointer) shown in the journal top pointer field T205 in the journal volume management table T200 match with each other (Step 1303).

If it is judged that the switch pointer and the journal top pointer do not match with each other (Step 1303: No), the controller 42a terminates the processing.

On the other hand, if it is judged that the switch pointer and the journal top pointer match with each other (Step 1303: Yes), the controller 42a sets "OFF" in the encryption key update status field T402 in the relevant entry in the encryption key update management table T400 (Step 1304) and deletes the encryption key assigned to the old journal volume in the management table T300 (Step 1305).

The controller 42a then enters the volume identifier entered in the storage-destination journal volume identifier field T202 in the read-source journal volume identifier field T204 in the relevant entry in the journal volume management table T200 (Step 1306), enters the top address of the journal volume identified by the storage-destination journal volume identifier field T202 in the journal top pointer field T205 in the relevant entry in the journal volume management table T200 (Step 1307), and terminates the processing.

For example, when the volume identifier for a new journal volume is "005" as shown in FIG. 4B, "003" in the read-source journal volume identifier field T202 in the journal volume management table T200 is replaced by "005" as shown in FIG. 4C. In addition, the top address "0" is entered in the journal top pointer field T203.

Although the storage apparatus 4a performs journal transfer processing in response to a journal read command from the storage apparatus 4b in this embodiment, the present invention is not limited to this arrangement, and the storage apparatus 4a may periodically perform the journal transfer processing. Alternatively, the storage apparatus 4a may transfer, every time a write command is received from the host computer 3a, a journal resulting from the write command to the storage apparatus 4b.

In Step 1305, the controller 42a may delete the encryption key in the relevant entry in the encryption management table T300 based on a command from the system administrator operating the management apparatus 5a instead of deleting it immediately.

Figure 14:
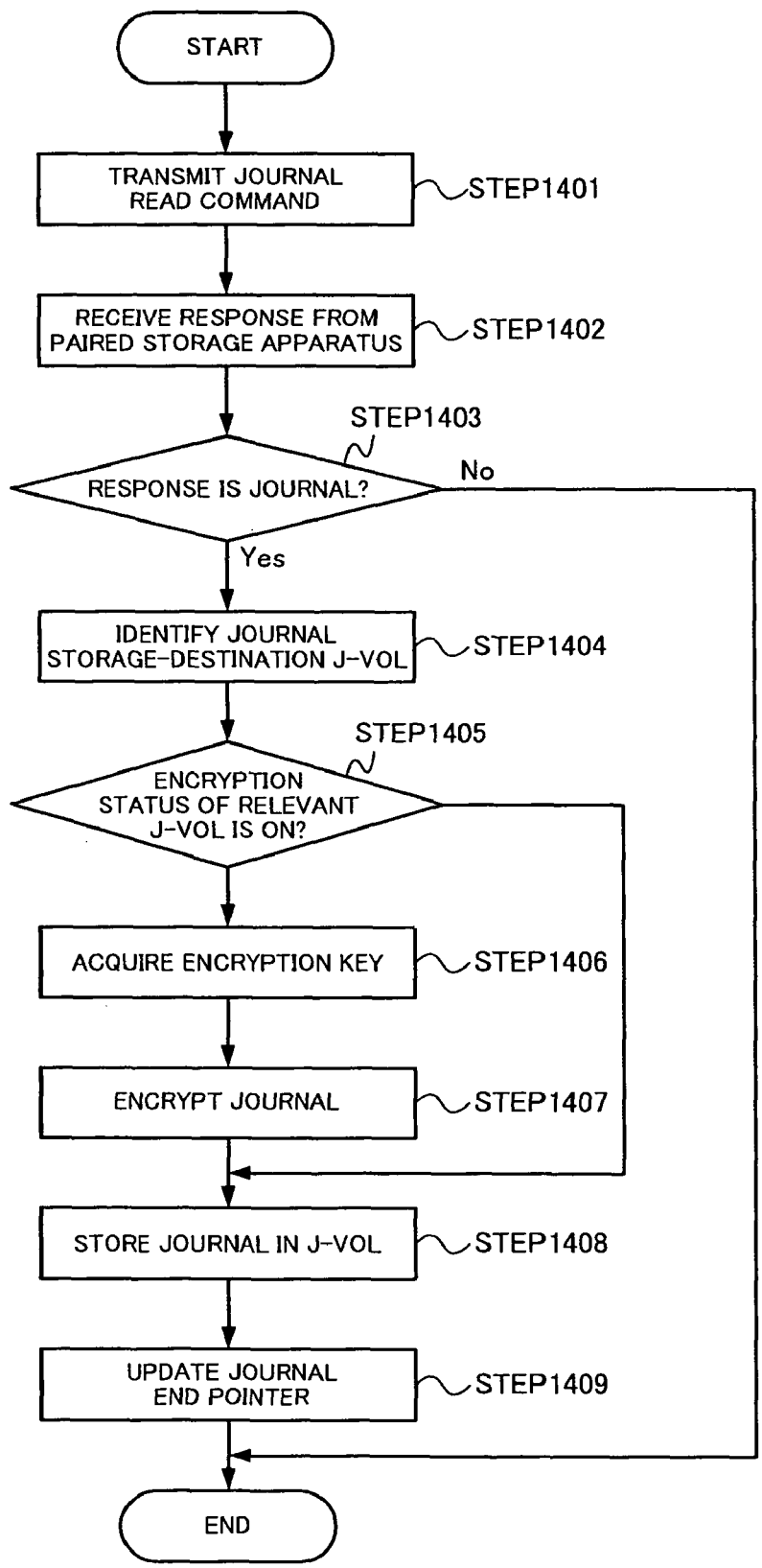
FIG. 14 is a flowchart explaining remote copy processing in a copy-destination storage apparatus in the storage system according to an embodiment.

FIG. 14 is a flowchart explaining remote copy in the storage system according to the embodiment of this invention. Specifically, FIG. 14 explains the operation of the storage apparatus 4b when the storage apparatus 4b transmits a remote copy request to the storage apparatus 4a.

As shown in FIG. 14, the controller 42 in the storage apparatus 4b (hereinafter referred to as a "controller 42b") transmits a journal read command to the storage apparatus 4a (Step 1401). The controller 42b receives a response to the journal read command from the storage apparatus 4a (Step 1402) and judges whether or not the response is a journal (Step 1403).

When the response is judged as being not a journal, i.e., the response indicates that there is no un-transferred journal (Step 1403: No), the controller 42b terminates the processing. On the other hand, if the response is determined as being a journal (Step 1403: Yes), the controller 42b refers to the journal volume management table T200 and acquires the volume identifier from the storage-destination journal volume field T201 and the journal end pointer from the journal end pointer field T203 in the relevant entry identified by the group identifier contained in the response (Step 1404). In other words, the controller 42b identifies the journal volume and the top address of the storage areas in this journal volume in which the transferred journal is to be stored. Next, the controller 42b refers to the encryption management table T300 and judges whether or not the encryption status of the journal volume in which the transferred journal is to be stored is "ON" (Step 1405).

If the encryption status of the journal volume in which the journal is to be stored is judged as being "ON" (Step 1405: Yes), the controller 42b refers to the encryption management table T300 and acquires the encryption key assigned to the relevant journal volume (Step 1406). Then the controller 42b encrypts the relevant journal using the acquired encryption key and according to a predetermined encryption algorithm (Step 1407), and stores the encrypted journal in the relevant journal volume (Step 1408). The controller 42b then updates the journal end pointer field T203 in the relevant entry in the journal volume management table T200 (Step 1409).

On the other hand, if the encryption status of the journal volume in which the journal is to be stored is judged as being not "ON" (Step 1405: No), the controller 42b stores the journal as it is (without encrypting it) in the relevant journal volume (Step 1408), and updates the journal end pointer field T203 in the relevant entry in the journal volume management table T200 (Step 1409).

Figure 15:
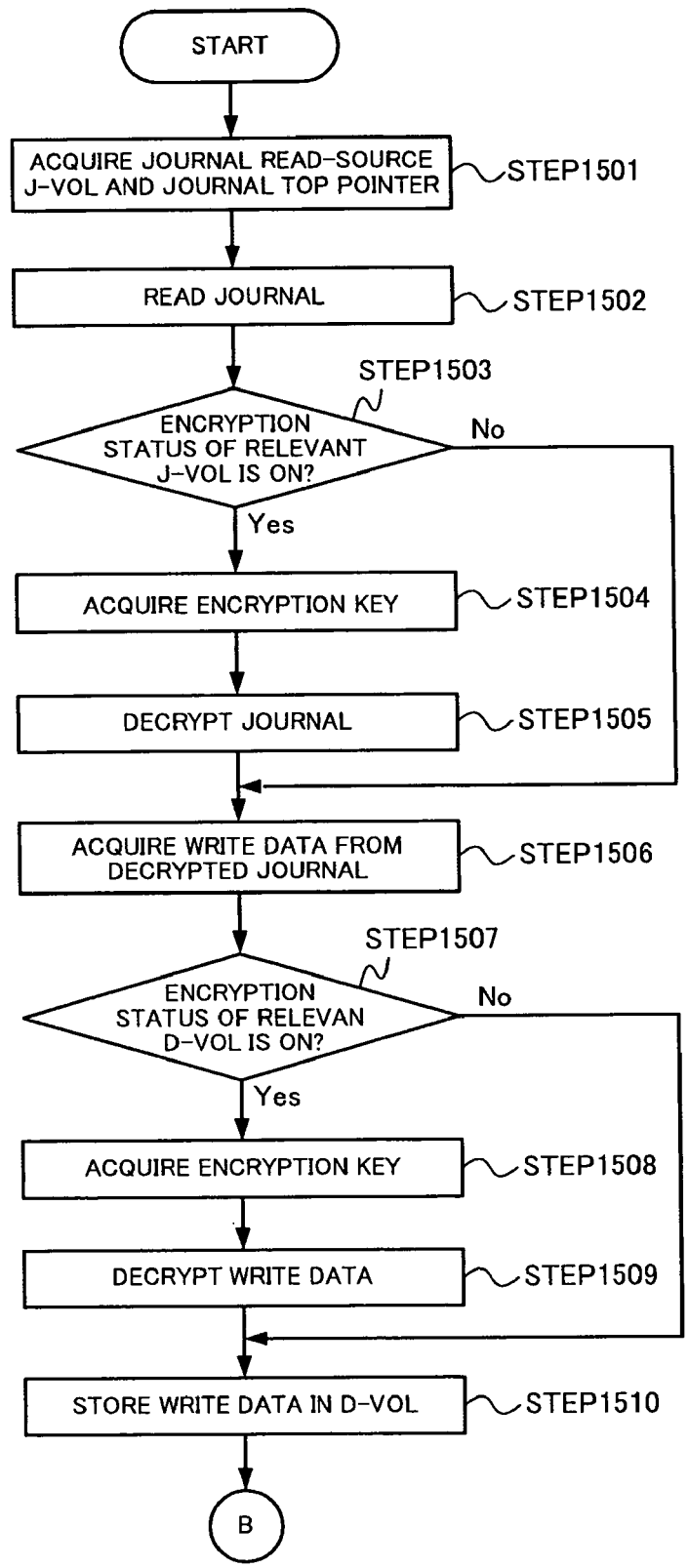
FIG. 15 is a flowchart explaining the remote copy processing in the copy-destination storage apparatus in the storage system according to an embodiment.
Figure 16:
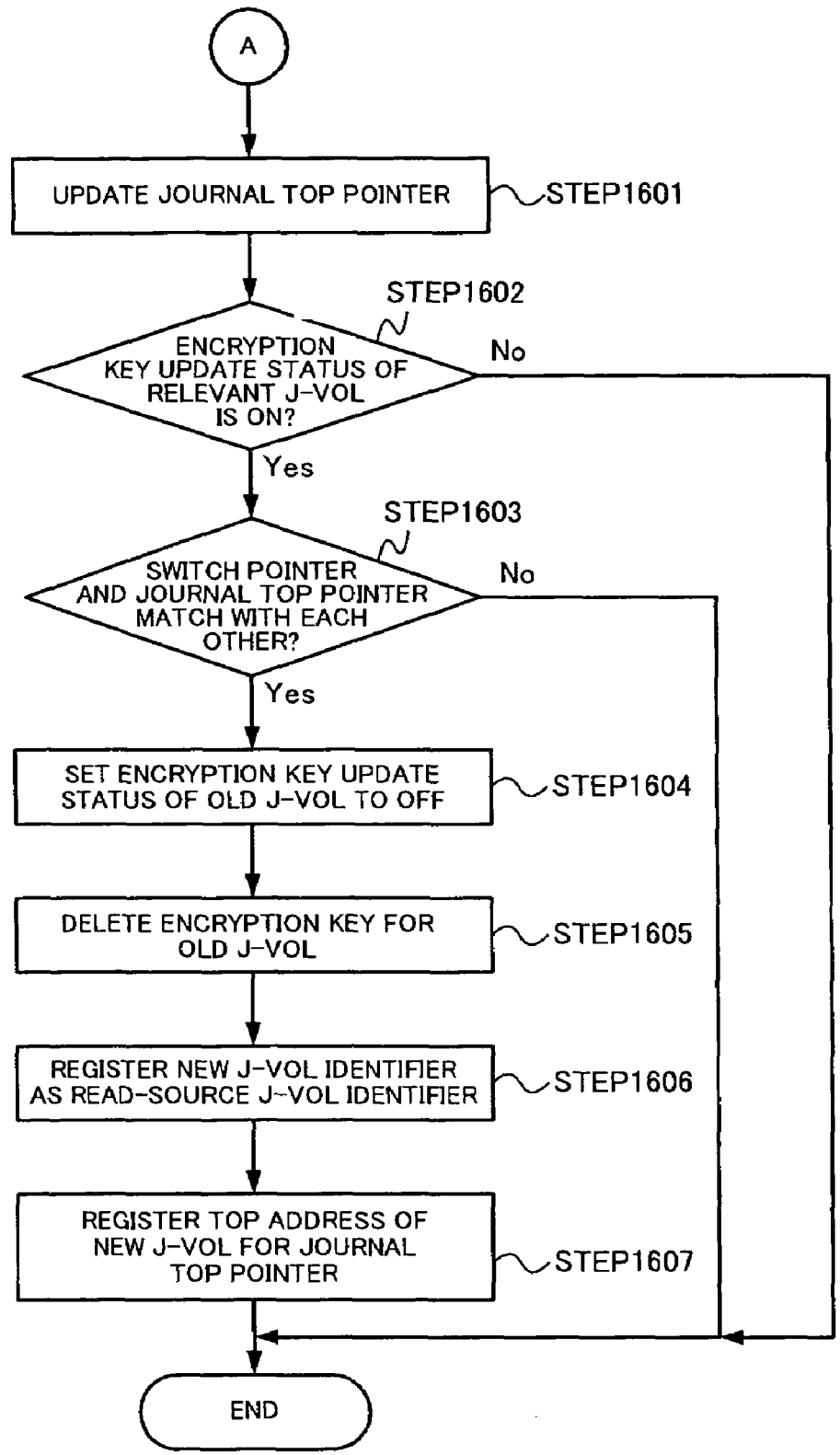
FIG. 16 is a flowchart explaining the remote copy processing in copy-destination storage apparatus in the storage system according to an embodiment.

FIGS. 15 and 16 are flowcharts each explaining the remote copy processing in the storage system according to the embodiment of this invention. Specifically, FIGS. 15 and 16 explain processing (restoration processing) in which the storage apparatus 4b creates a replication of a data volume based on a journal received from the storage apparatus 4a.

The controller 42b refers to the journal volume management table T200, extracts the volume identifier entered in the journal read-source journal volume field T204 and the journal top pointer entered in the journal top pointer field T205 (Step 1501), and reads a journal from the area specified by the extracted volume identifier and the journal top pointer (Step 1502).

Next, the controller 42b refers to the encryption management table T300 and judges whether or not the encryption status of this read-source journal volume is "ON" (Step 1503). If the encryption status of the read-source journal volume is judged as being "ON" (Step 1503: Yes), the controller 42b refers to the encryption management table T300 and acquires the encryption key assigned to the relevant read-source journal volume (Step 1504). Then the controller 42b decrypts the read journal using the acquired encryption key and according to a predetermined decryption algorithm (Step 1505) and acquires data (original write data) from the decrypted journal (Step 1506). On the other hand, if the encryption status of the relevant read-source journal volume is judged as being not "ON" (Step 1503: No), the controller 42b directly acquires the write data from the read-source journal (Step 1506).

The controller 42b extracts the volume identifier entered in the copy-destination data volume identifier field T102 in the relevant entry in the pair management table T100 based on meta data contained in the journal and refers to the encryption management table T300 in order to judge whether or not the encryption status of the copy-destination data volume identified by the extracted volume identifier is "ON" (Step 1507).

If the encryption status of the copy-destination data volume is determined as being "ON" (Step 1507: Yes) the controller 42b acquires the encryption key for the relevant data volume from the encryption management table T300 (Step 1508). The controller 42b then encrypts the data accompanying the write command using the acquired encryption key and according to a predetermined encryption algorithm (Step 1509), and stores the encrypted data in the relevant data volume (Step 1510). On the other hand, if the copy-source data volume is judged as being not encrypted (Step 1507: No), the controller 42b stores the data accompanying the write command as it is (without encrypting it) in the relevant data volume (Step 1510).

Next, the controller 42b updates the journal top pointer in the journal top pointer field T205 in the relevant entry in the journal volume management table T200 in accordance with the data size of the stored journal (Step 1601 in FIG. 16). The controller 42b also refers to the encryption key update management table T400 and judges whether or not the encryption key update status of the relevant journal volume is "ON" (Step 1602).

If the encryption key update status is determined as being not "ON," i.e., there is no new volume (Step 1602: No), the controller 42b terminates the restoration processing. When receiving a journal read command next time, the controller 42a performs the above-described processing to transmit journals from the journal indicated by the journal top pointer.

On the other hand, if the encryption key update status is judged as being "ON," i.e., there is a new journal volume, (Step 1602: Yes) the controller 42b judges whether or not the address (switch pointer) shown in the switch pointer field T403 in the encryption key update management table T400 and the address (journal top pointer) shown in the journal top pointer field T205 in the journal volume management table T200 match with each other (Step 1603). In short, the controller 42b judges whether or not there is a journal that should be processed in the old journal volume.

If it is judged that the switch pointer and the journal top pointer do not match with each other, i.e., there is a journal that should be processed in the old journal volume (Step 1603: Yes), the controller 42b terminates the processing.

On the other hand, if it is judged that the switch pointer and the journal top pointer match with each other, i.e., there is no journal that should be processed in the old journal volume (Step 1603: No), the controller 42b sets "OFF" in the encryption key update status field T402 in the relevant entry in the encryption key update management table T400 (Step 1604), and deletes the encryption key assigned to the old journal volume in the encryption management table T300 (Step 1605).

Next, the controller 42b enters the volume identifier entered in the storage-destination journal volume identifier field in the read-source journal volume identifier filed T204 in the relevant entry in the journal volume management table T200 (Step 1606). The controller 42b then enters the top address of the journal volume identified by the storage-destination journal volume identifier field in the journal top pointer field T205 in the relevant field in the journal volume management table T200 (Step 1607), and terminates the processing.

As described above, in this embodiment, when one storage apparatus 4 receives an encryption key update command from the management apparatus 5, the storage apparatus 4 secures a new journal volume, assigns a newly-created encryption key to the new journal volume, and stores journals to be created thereafter in the new journal volume. When the storage apparatus 4 completes the decryption and transfer of a journal that has been encrypted with an old encryption key and stored in an old journal volume, based on a journal read command from another storage apparatus 4 having a volume which is a paired volume in the defined pair relationship, the storage apparatus 4 decrypts and transfers the journal that has been encrypted using the new key and stored in the new journal volume.

Second Embodiment

Figure 17:
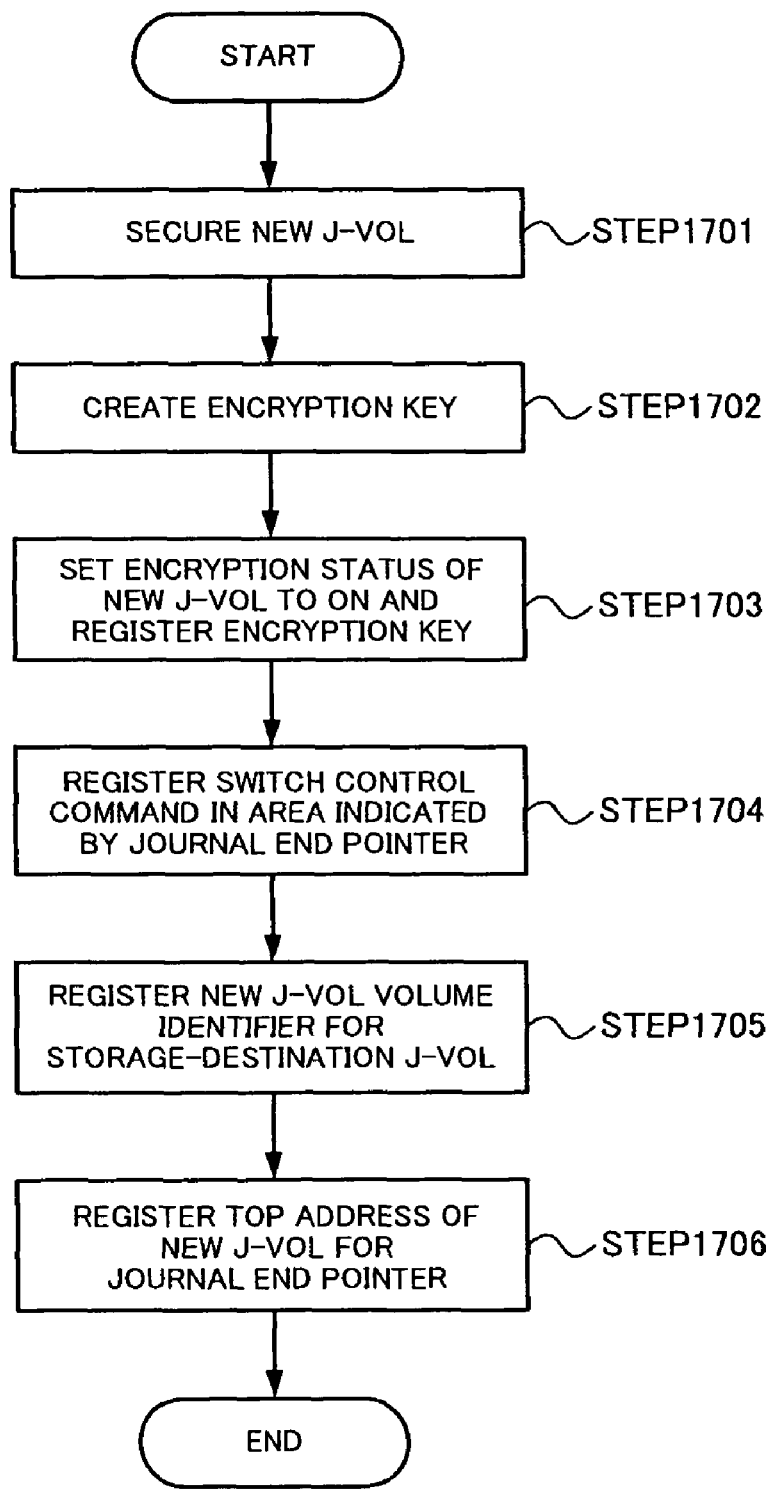
FIG. 17 is a flowchart explaining encryption key update processing in a storage apparatus according to an embodiment of this invention.

This embodiment has a feature in which a switch control command is written in a journal volume storage area indicated by a journal end pointer, instead of providing a switch pointer managed by the encryption key update management table, to switch a storage-destination for journals to a storage area in a new journal volume. The description below mainly describe differences from the embodiment FIG. 17 is a flowchart for explaining encryption key update processing in the storage apparatus 4 according to the embodiment of this invention. Specifically, FIG. 17 explains the operation of the storage apparatus 4a when the storage apparatus 4a receives an encryption key update command from the management apparatus 5a.

A system administrator operates the management apparatus 5a to command the storage apparatus 4a to update an encryption key, and the management apparatus 5a transmits an encryption key update command to the storage apparatus 4a. The encryption key update command includes a volume identifier for identifying a journal volume as the target of the encryption key update processing (old journal volume) and the issue time of the encryption key update command.

When receiving the encryption key update command from the management apparatus 5a via the management network 2B, the controller 42a in the storage apparatus 4a ensures another new journal volume (new journal volume) in a disk drive 41 (Step 1701).

The controller 42a creates a new encryption key using the issue time of the encryption key update command, a random number generator or similar and according to a predetermined encryption key creation algorithm (Step 1702), and updates the encryption management table T300 (Step 1703). Specifically, the controller 42a sets "ON" in the encryption status field T302 in the relevant entry in the encryption management table T300 and enters the created encryption key in the encryption key field.

The controller 42a then refers to the journal volume management table T200 and writes a switch control command in the storage area indicated by the journal end pointer (Step 1704). The switch control command includes a new journal volume identifier and the top address of the storage areas in the new journal volume.

Further, the controller 42a refers to the journal volume management table T200, extracts an entry in which the storage-destination journal volume identifier field T202 indicates an old journal volume, and enters the volume identifier of the new journal volume in the storage-destination journal volume identifier field T202 in the relevant entry (Step 1705). Namely, the storage-destination journal volume is switched from the old journal volume to the new journal volume. Then, the controller 42a enters the top address of the new journal volume storage area in the journal end pointer field T203 in the relevant entry in the journal volume management table T200 (Step 1706).

Figure 18A:
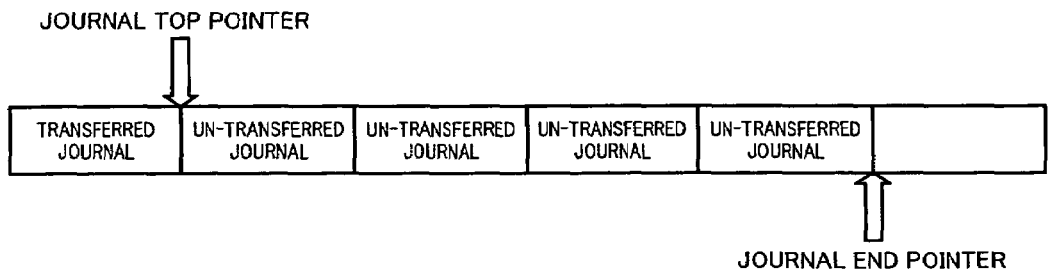
FIGS. 18A to 18C are diagrams explaining a relationship between an old journal volume and a new journal volume in the storage apparatus according to an embodiment.
Figure 18B:
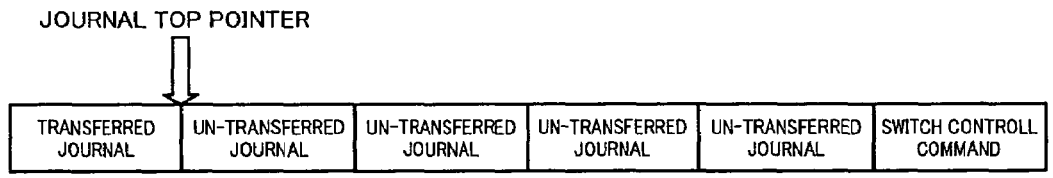
Figure 18C:

Suppose the old journal volume is in the state shown in FIG. 18A immediately before the encryption key update command is issued. When the storage apparatus 4 receives the encryption key update command from the management apparatus 5 and performs the processing sequence described above, the old journal volume and the new journal volume will change to the states shown respectively in FIGS. 18B and 18C. Specifically, the switch control command is written in the storage area indicated by the journal end pointer in the old journal volume (FIG. 18B), and the journal end pointer is set to a storage area in the new journal volume. In the state immediately after the reception and execution of the encryption key update command, where a write command has not been received, the journal end pointer serves as the top address of unused storage areas in the new journal volume.

Figure 19:
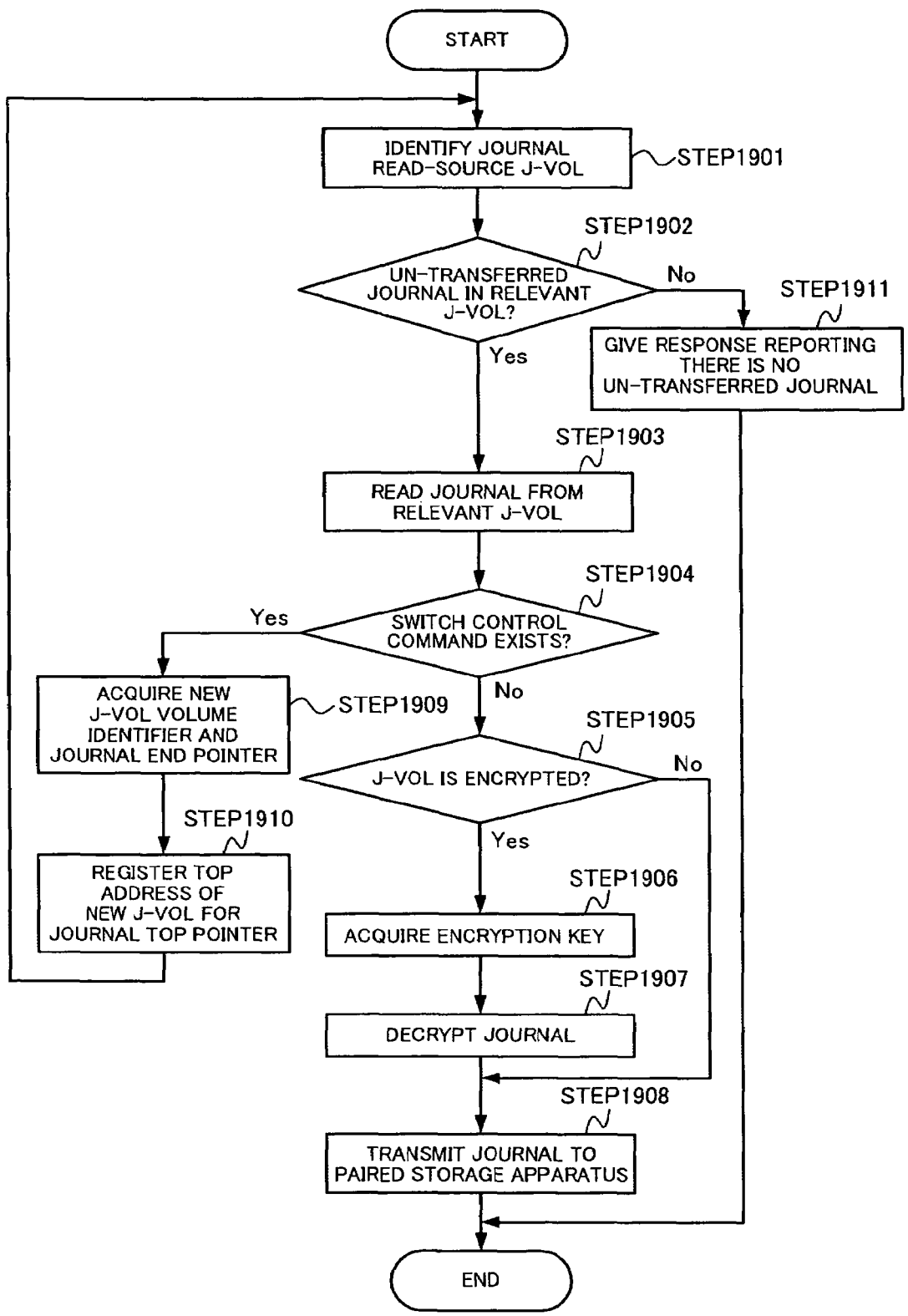
FIG. 19 is a flowchart explaining the remote copy processing in the copy-source storage apparatus in the storage system according to an embodiment.

FIG. 19 is a flowchart explaining remote copy in the storage system according to the embodiment of this invention. Specifically, FIG. 19 explains the operation of the storage apparatus 4a when the storage apparatus 4a receives a remote copy request (journal read command) from the storage apparatus 4b.

First, referring to FIG. 19, when the controller 42a in the storage apparatus 4a receives a journal read command from the storage apparatus 4b which has a paired volume, the storage apparatus 4a refers to the journal volume management table T200, extracts the relevant entry based on a group identifier contained in the journal read command, and acquires the volume identifier entered in the read-source journal volume identifier field T204 in the relevant entry (Step 1901). In short, the controller 42a identifies the journal volume (read-source journal volume) that stores a journal to be transferred to the storage apparatus 4b. Then, the controller 42a judges whether or not the address (journal end pointer) shown in the journal end pointer field and the address journal top pointer) shown in the journal top pointer field in the relevant field match with each other in order to check the existence of a un-transferred journal in the read-source journal volume (Step 1902).

If it is judged that the journal end pointer and the journal top pointer match with each other, i.e., there is no un-transferred journal (Step 1902: Yes), the controller 42a transmits a response to the controller in the storage apparatus 4b, reporting that there is no journal to be transferred, (Step 1911) and terminates the transmission-side remote copy processing.

On the other hand, if it is judged that the address shown in the journal end pointer field and the address shown in the journal top pointer field do not match with each other, i.e., there is a un-transferred journal (Step 1902: No), the controller 42a refers to the journal volume management table T200, reads the data stored in the storage area indicated by the journal top pointer (Step 1903), and judges whether or not the read data is a switch control command (Step 1904).

If the read data is judged as being not the switch control command (Step 1904: No) the controller 42a then refers to the encryption management table T300 and judges whether or not the encryption status of the relevant read-source journal volume is "ON" (Step 1905). If the encryption status of the relevant read-source journal volume is judged as being not "ON" (Step 1905: No), the controller 42a transfers the read journal as it is to the storage apparatus 4b (Step 1908).

If the encryption status of the relevant read-source journal volume is judged as being "ON" (Step 1905: Yes), the controller 42a acquires the encryption key assigned to the relevant read-source journal volume from the encryption management table T300 (Step 1906). Then, the controller 42a decrypts the read journal using the acquired encryption key and according to a predetermined algorithm (Step 1907), and transmits the decrypted journal to the storage apparatus 4b (Step 1908).

If the read data is judged as being the switch control command (Step 1904: Yes), the controller 42a acquires the volume identifier and the journal end pointer contained in this switch control command (Step 1909). The volume identifier and the journal end pointer indicate the top address of the storage area in which the journal will be stored in the new journal volume. Then, the controller 42a enters the acquired volume identifier in the read-source journal volume identifier field T204 and the acquired journal end pointer in the journal top pointer field T205 in the relevant entry in the journal volume management table T200 (Step 1910). Then, the controller 42a returns to the processing of Step 1901.

As described above, in this embodiment, when one storage apparatus 4 receives an encryption key update command from the management apparatus 5, the storage apparatus 4 secures a new journal volume and assigns a new encryption key to the secured journal volume. The storage apparatus 4 stores a switch control command in the old journal volume storage area indicated by the journal end pointer and thereby stores journals created after the switch control command in the new journal volume. When the storage apparatus 4 completes the decryption and transfer of a journal that has been encrypted with an old encryption key and stored in the old journal volume in response to a journal read command from another storage apparatus 4 having a volume which has paired volume in the defined pair relationship, the storage apparatus 4 decrypts the journal that has been encrypted with a new encryption key and stored in the new journal volume based on the switch control command and transfers the decrypted journal to another storage apparatus.

Third Embodiment

This embodiment provides a mechanism for storing journals continuously in an existing journal volume without securing a new journal volume when an encryption key is updated.

Figure 20:
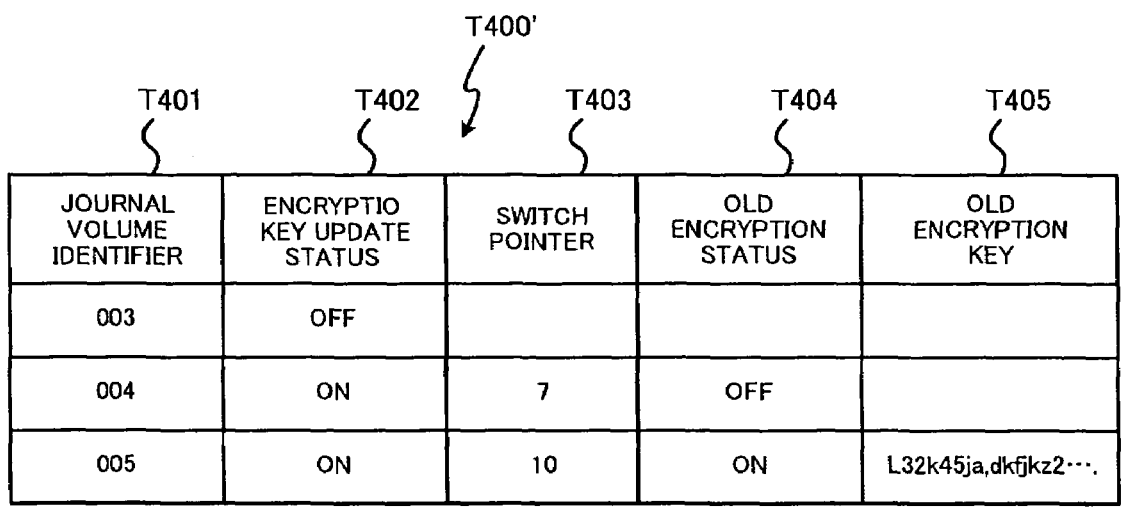
FIG. 20 is a diagram explaining the structure of an encryption key update management table in a storage apparatus according to an embodiment of this invention.

FIG. 20 is a diagram for explaining the structure of an encryption key update management table T400' in the storage apparatus 4 according to the embodiment of this invention.

As shown in FIG. 20, the encryption key update management table T400' in this embodiment includes the journal volume identifier field T401, the encryption key update status field T402, the switch pointer filed T403, an old encryption status field T404 and an old encryption key field T405. Compared with the encryption key update management table T400 shown in FIG. 7, the old encryption status field T404 and the old encryption key field T405 are additionally provided.

Entered in the old encryption status field T404 is the encryption status of a journal volume specified by an encryption key update command before the reception of this encryption key update command. Entered in the encryption key field T405 is an encryption key that was assigned to the relevant journal volume before the reception of the encryption key update command.

Figure 21:
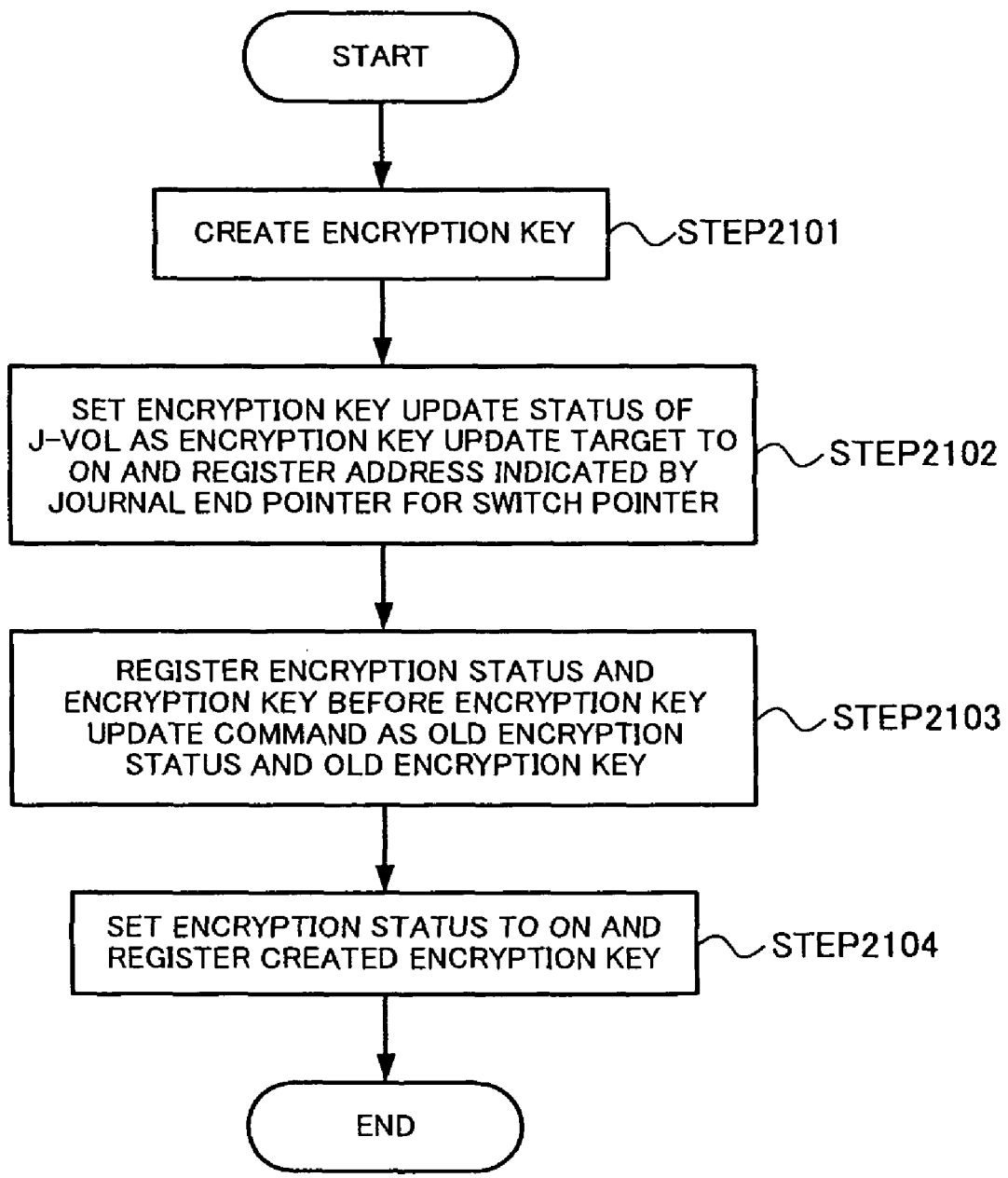
FIG. 21 is a flowchart explaining encryption key update processing in the storage apparatus according to an embodiment.

FIG. 21 is a flowchart explaining encryption key update processing in the storage apparatus 4 according to the embodiment of this invention. Specifically, FIG. 21 shows the operation of the storage apparatus 4a when the storage apparatus 4a receives an encryption key update command from the management apparatus 5a.

First, when receiving an encryption key update command from the management apparatus 5a via the management network 2B, the controller 42a in the storage apparatus 4a creates a new encryption key using the issue time, a random number function or similar and according to a predetermined encryption key creation algorithm (Step 2101).

Next, the controller 42a refers to the encryption key update management table T400', sets "ON" in the encryption key update status field T402 of the journal volume specified in the encryption key update command, and enters the address indicated by the journal end pointer in the switch pointer field T403 (Step 2102).

The controller 42a also enters, in the old encryption status field T404 in the encryption key update management table T400', the current encryption key update status shown in the encryption status field T302 in the corresponding entry in the encryption management table T300. If the relevant encryption key update status is "ON", the controller 42a enters in the old encryption key field T305 the encryption key entered in the encryption key field T303 in the corresponding entry in the encryption management table T300 (Step 2103). In other words, the controller 42a saves the encryption status and the encryption key of the journal volume as of immediately before the reception of the encryption key update command. With the arrangement, even if the encryption management table T300 is updated, information used for decrypting old journals can be saved.

The controller 42a next refers to the encryption management table T300, sets "ON" in the encryption status field T302 for the journal volume specified in the encryption key update command, and enters the newly-created encryption key in the encryption key field (Step 2104).

Figure 22A:
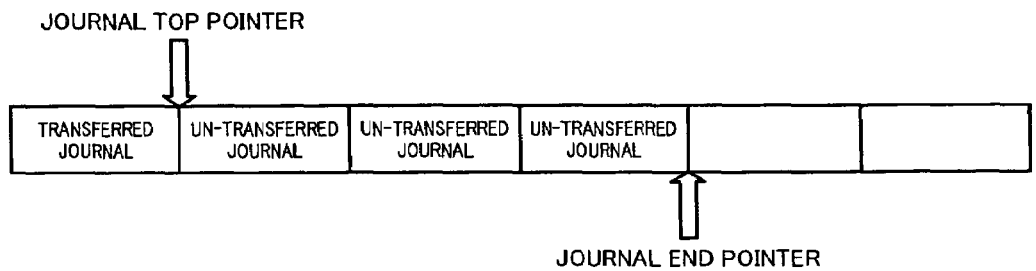
FIGS. 22A to 22C are diagrams explaining a journal volume storage area in which journals are stored in the storage apparatus according to an embodiment.
Figure 22B:
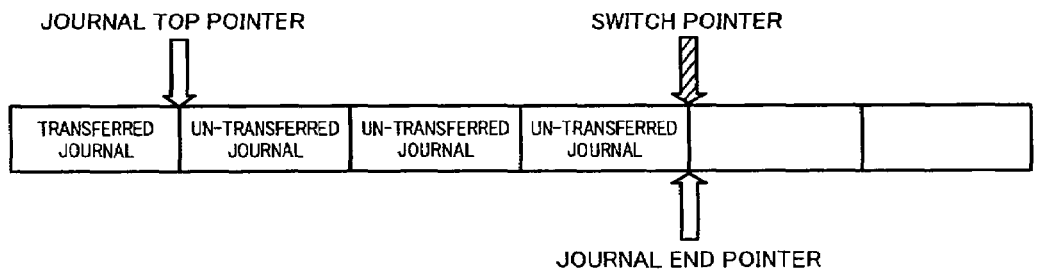
Figure 22C:
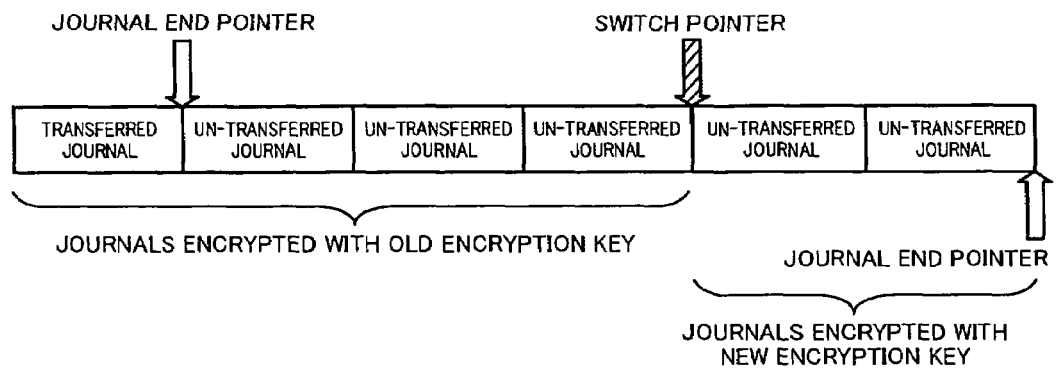

Suppose a journal volume is in the state shown in FIG. 22A immediately before an encryption key update command is issued. When the storage apparatus 4 receives the encryption key update command from the management apparatus 5 and performs the above processing sequence, the journal volume will be changed to the state shown in FIG. 22B. Specifically, immediately after the encryption key update, the storage area indicated by the journal end pointer in the journal volume is also indicated by the switch pointer. After this, every time a journal is created and stored based on a write request, the address indicated by the journal end pointer is updated.

Figure 23:
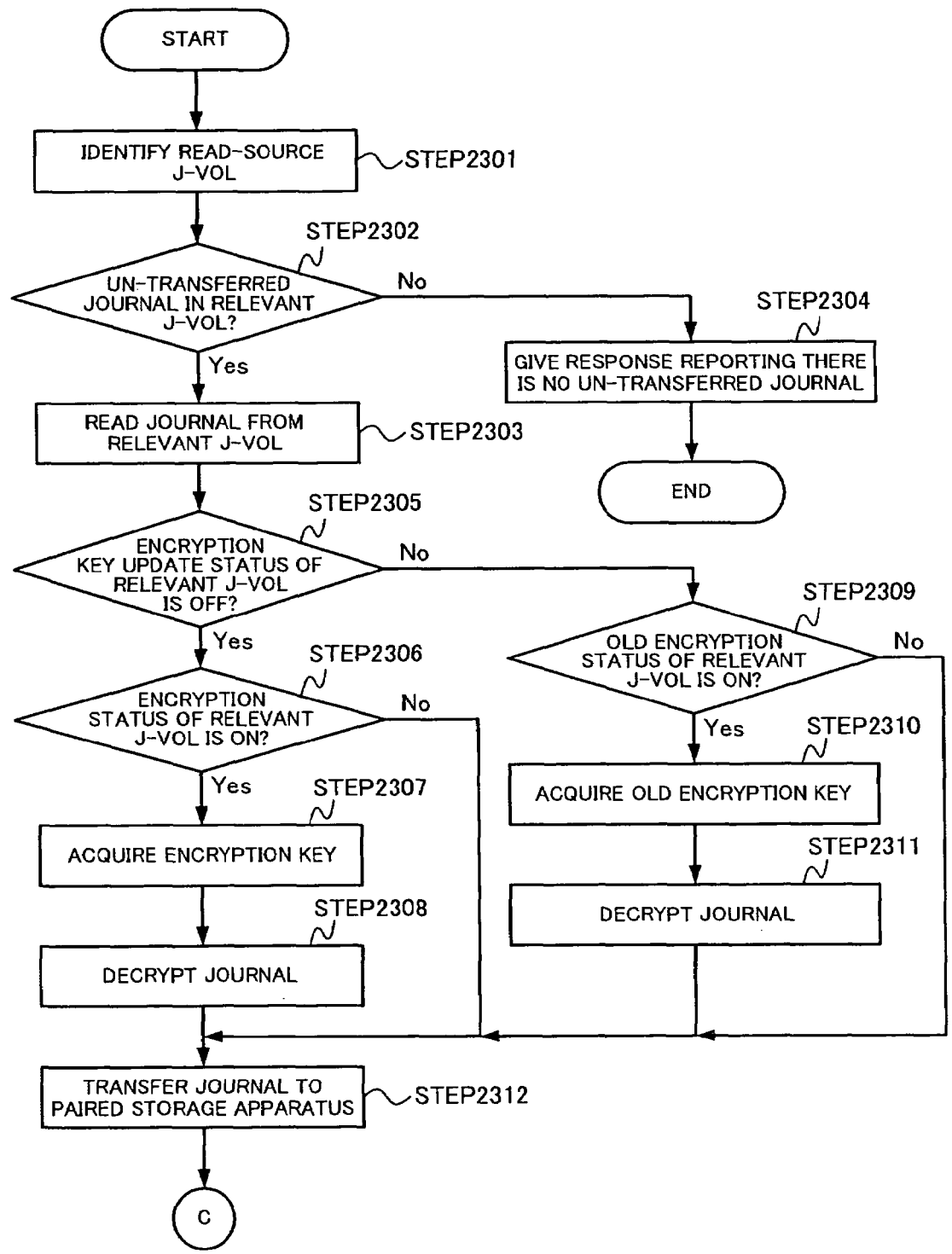
FIG. 23 is a flowchart explaining remote copy processing in a copy-source storage apparatus in a storage system according to an embodiment.
Figure 24:
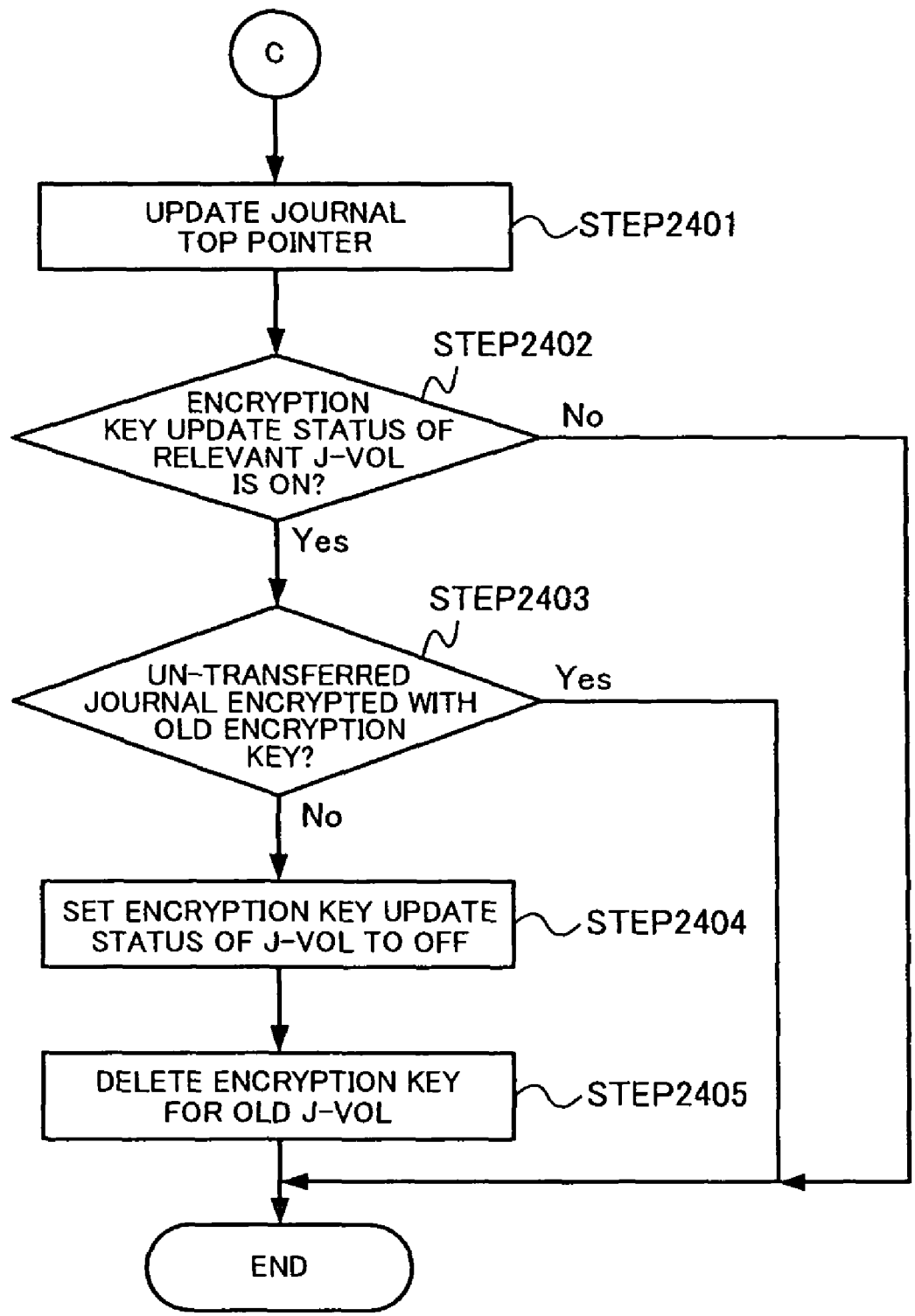
FIG. 24 is a flowchart explaining the remote copy processing in the copy-source storage apparatus in the storage system according to an embodiment.

FIGS. 23 and 24 are flowcharts each explaining remote copy in the storage system according to the embodiment of this invention. Specifically, FIGS. 23 and 24 explain the operation of the storage apparatus 4a when the storage apparatus 4a receives a remote copy request (journal read command) from the storage apparatus 4b.

Referring to FIG. 23, when the storage apparatus 4a receives a journal read command from the storage apparatus 4b having a paired volume, the controller 42a in the storage apparatus 4a refers to the journal volume management table T200, acquires the volume identifier entered in the read-source journal volume identifier field T204 in the relevant entry based on the group identifier contained in the journal read command (Step 2301). In short, the controller 42a identifies the journal volume that stores a journal to be transferred to the storage apparatus 4b (read-source journal volume).

The controller 42a then judges whether or not the journal end pointer and the journal top pointer match with each other in the relevant entry in order to check for the existence of an un-transferred journal in the read-source journal volume (Step 2302).

If it is Judged that the journal end pointer and the journal top pointer match with each other, i.e., there is no un-transferred journal (Step 2302: No), the controller 42a transmits to the controller in the storage apparatus 4b a response reporting that there is no journal to be transferred (Step 2304) and terminates the transmission-side remote copy processing.

On the other hand, if it is judged that the journal end pointer and the journal top pointer match with each other, i.e., there is a un-transferred journal (Step 2302: Yes), the controller 42a reads data stored in the storage area indicated by the journal end pointer in the relevant entry in the journal volume management table T200 (Step 2303). Then, the controller 42a refers to the encryption key update management table T400' and judges whether or not the encryption key update status of the read-source journal volume is "OFF" (Step 2305).

If the encryption key update status of the relevant read-source journal volume is judged as being "OFF" (Step 2305: Yes), the controller 42a refers to the encryption management table T300 and judges whether or not the encryption status of the relevant read-source journal volume is "ON" (Step 2306). If the encryption status of the relevant read-source journal volume is determined as being not "ON" (Step 2306: No), the controller 42a transmits the read journal as it is to the storage apparatus 4b (Step 2312).

On the other hand, if the encryption status of the relevant read-source journal volume is judged as being "ON" (Step 2306: Yes), the controller 42a acquires the current encryption key assigned to the relevant read-source journal volume from the encryption management table T300 (Step 2307). Then, the controller 42a decrypts read journal using the acquired encryption key and according to a predetermined decryption algorithm (Step 2308) and transmits the decrypted journal to the storage apparatus 4b (Step 2312).

If the encryption key update status of the relevant read-source journal volume is judged as being not "OFF" (Step 2305: No), the controller 42a refers to the encryption management table T300 and judges whether or not the old encryption status of the relevant read-source journal volume is "ON" (Step 2309). If the old encryption status is judged as being not "ON" (Step 2309: No), the controller 42a transmits the read journal as it is to the storage apparatus 4b (Step 2312).

On the other hand, if the old encryption status of the relevant read-source journal volume is judged as being "ON" (Step 2309: Yes), the controller 42a acquires the old encryption key that had been assigned to the relevant read-source journal volume from the encryption management table T300 (Step 2310). Then the controller 42a decrypts the read journal using the acquired old encryption key and according to a predetermined decryption algorithm (Step 2311) and transmits the decrypted journal to the storage apparatus 4b (Step 2312).

The controller 42a then updates the journal top pointer field T205 in the relevant entry in the journal volume management table T200 in accordance with the data size of the journal that has been read and transferred (Step 2401 in FIG. 24). In other words, the top address of the storage areas storing un-transferred journals in the relevant journal volume is entered in the journal top pointer field.

Next, the controller 42a refers to the encryption key update management table T400' and judges whether or not the encryption key update status of the relevant read-source journal volume is "ON" (Step 2402). If the encryption key update status of the relevant read-source journal volume is determined as being not "ON" (Step 2402: No), the controller 42a terminates the transmission-side remote copy processing. In this case, if there is a journal left, that journal will be transferred in response to the next journal transmission command.

On the other hand, if the encryption key update status of the relevant read-source journal volume is determined as being "ON" (Step 2402: Yes), the controller 42a then judges whether or not the address shown in the switch pointer field T403 in the encryption key update management table T400' and the address shown in the journal top pointer field T205 in the journal volume management table T200 match with each other (Step 2403). In short, the controller 42a judges whether or not there is an un-transferred journal that has been encrypted with an old encryption key in the relevant read-source journal volume.

If it is judged that the address shown in the switch pointer field T403 in the encryption key update management table T400' and the address shown in the journal top pointer field T205 in the journal volume management table T200 do not match with each other, i.e., there is a un-transferred journal that has been encrypted with the old encryption key in the relevant read-source journal volume (Step 2403: Yes), the controller 42a terminates the processing.

On the other hand, if it is judged that the address shown in the switch pointer field T403 in the encryption key update management table T400' and the address shown in the journal top pointer field T205 in the journal volume management table T200 match with each other, i.e., there is no un-transmitted journal that has been encrypted with the old encryption key in the relevant read-source journal volume (Step 2403: No), the controller 42a sets "OFF" in the encryption key update status field in the relevant entry in the encryption key update management table T400' (Step 2404), and deletes the encryption key that has been assigned to the journal volume in the encryption management table T300 (Step 2405).

Figure 25:
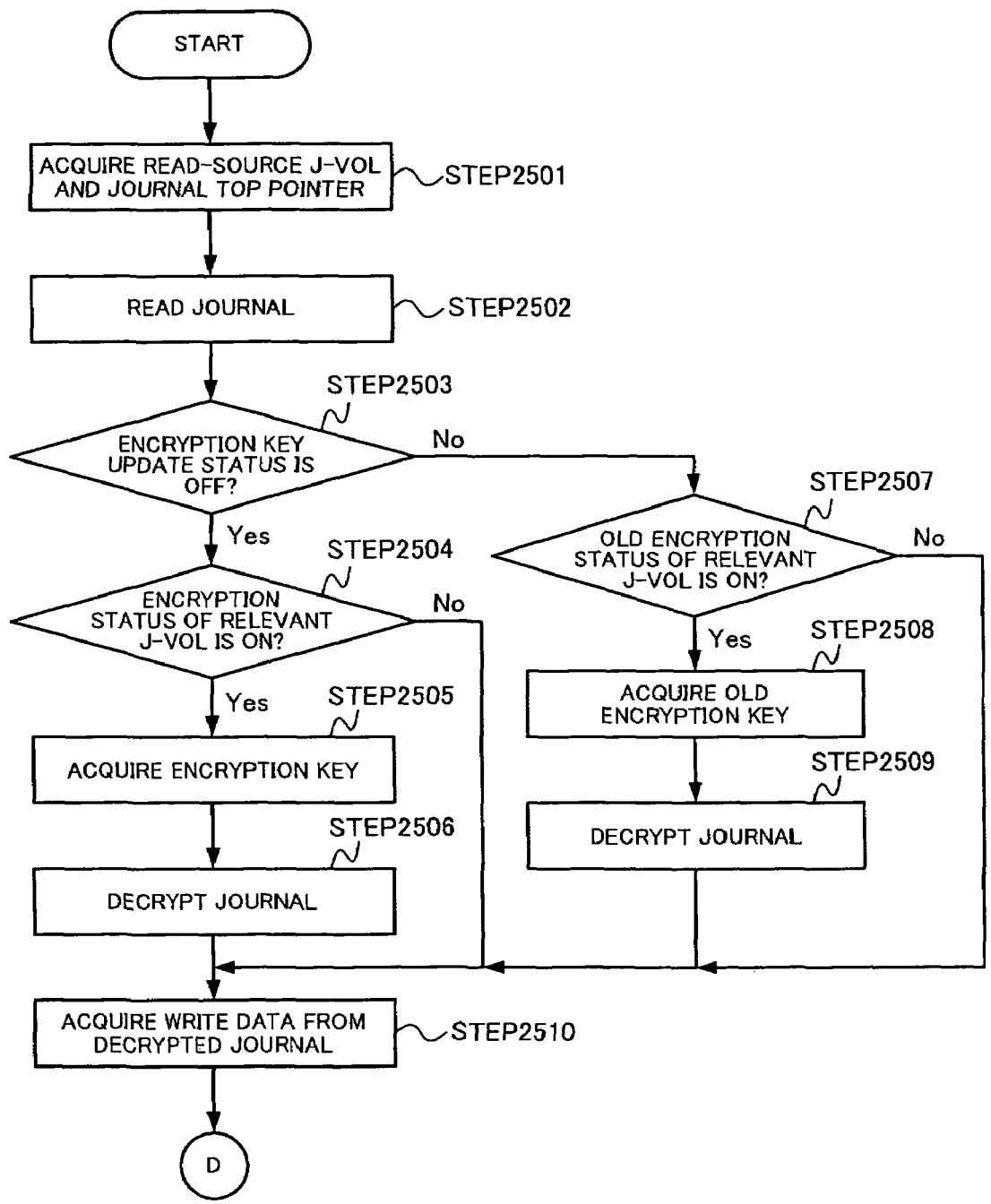
FIG. 25 is a flowchart explaining remote copy processing in a copy-destination storage apparatus in the storage system according to an embodiment.
Figure 26:
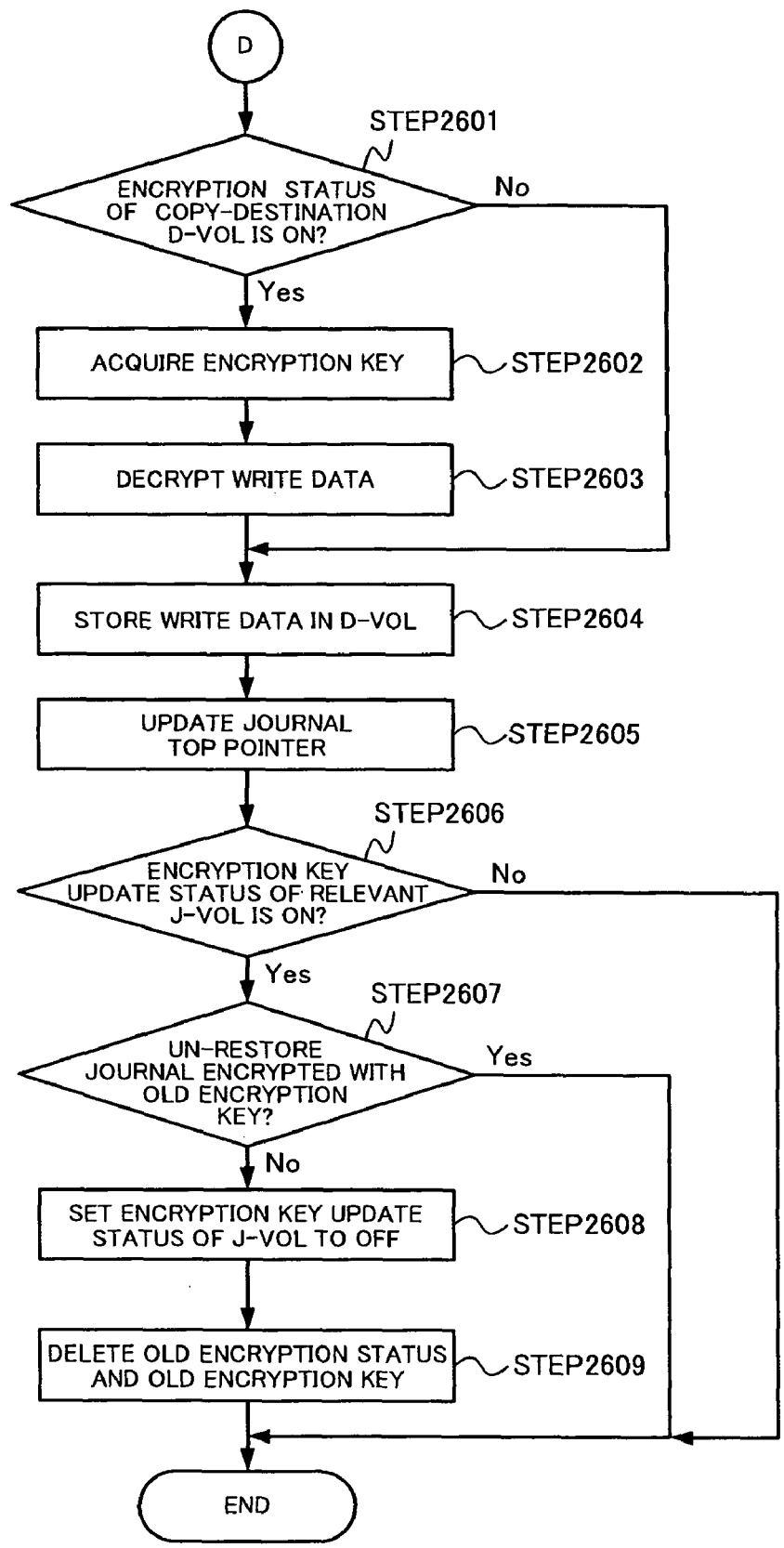
FIG. 26 is a flowchart explaining the remote copy processing in the copy-destination storage apparatus in the storage system according to an embodiment.

FIGS. 25 and 26 are flowcharts each explaining the remote copy in the storage system according to the embodiment of this invention. Specifically, FIGS. 25 and 26 explain processing (restoration processing) in which the storage apparatus 4b creates a replication of a data volume based on a journal received from the storage apparatus 4a.

The controller 42b in the storage apparatus 4b refers to the journal volume management table T200, extracts the volume identifier and the journal top pointer of the read-source journal volume (Step 2501), and reads a journal from the storage area indicated by the extracted volume identifier and journal top pointer (Step 2502). Then the controller 42b refers to the encryption key update arrangement table T400' and judges whether or not the encryption key update status of the relevant journal volume is "OFF" (Step 2503).

If the encryption key update status of the relevant journal volume is judged as being "OFF" (Step 2503: Yes), the controller 42b refers to the encryption management table T300 and judges whether or not the encryption status of the relevant read-source journal volume is "ON" (Step 2504).

If the encryption status of the relevant read-source journal volume is determined as being "ON" (Step 2504: Yes), the controller 42b acquires the encryption key assigned to the relevant read-source journal volume from the encryption management table T300 (Step 2505). Then, the controller 42b decrypts the read journal using the acquired encryption key and according to a predetermined decryption algorithm (Step 2506) to acquire write data from the decrypted journal (Step 2510). On the other hand, if the relevant read-source journal volume is judged as being not encrypted (Step 2504: No), the controller 42b directly acquires write data from the read journal (Step 2510).

If the encryption key update status of the relevant journal volume is determined as being "OFF" (Step 2503: No), the controller 42b refers to the encryption management table T300 and judges whether or not the old encryption status of the read-source journal volume is "ON" (Step 2507).

If the old encryption status of the relevant read-source journal volume is judged as being "ON" (Step 2507: Yes), the controller 42b acquires the old encryption key that had been assigned to the relevant read-source journal volume from the encryption management table T300 (Step 2508). Then, the controller 42b decrypts the read journal using the acquired old encryption key and according to a predetermined decryption algorithm (Step 2509), and acquires write data from the decrypted journal (Step 2510). On the other hand, if the old encryption status of the relevant read-source journal volume is judged as being not "ON" (Step 2507: No), the controller 42b directly acquires the write data from the read journal (Step 2510).

The controller 42b next extracts the volume identifier entered in the copy-destination data volume identifier field in the relevant entry in the pair management table T100 based on the meta data contained in the journal. Further, the controller 42b refers to the encryption management table T300 and judges whether or not the copy-destination data volume identified by the relevant identifier has been encrypted (Step 2601 in FIG. 26).

If the encryption status of the copy-destination data volume is judged as being "ON" (Step 2601: Yes), the controller 42b acquires the encryption key for the relevant data volume from the encryption management table T300 (Step 2602). Then, the controller 42b encrypts data accompanying the write command using the acquired encryption key and according to a predetermined encryption algorithm (Step 2603), and stores the encrypted data in the relevant data volume (Step 2604). On the other hand, if the encryption status of the copy-destination data volume is judged as being not "ON" (Step 2601: No), the controller 42b stores the data accompanying the write command as it is (without encrypting it) in the relevant data volume (Step 2604).

The controller 42b then updates the journal top pointer field T205 in the relevant entry in the journal volume management table T200 in accordance with the data size of the stored journal (Step 2605). The controller 42b refers to the encryption key update management table T400' and judges whether or not the encryption key update status of the relevant journal volume is "ON" (Step 2606). If the encryption key update status is determined as being "ON," i.e., there is no switch pointer (Step 2606: No), the controller 42b terminates the restoration processing. In this case, if the journals still exists, the journals will be transferred in response to a journal read command next time.

On the other hand, if the encryption key update status of the relevant journal volume is determined as being "ON," i.e., there is a switch pointer (Step 2606: Yes) the controller 42b then judges whether or not the address shown in the switch pointer field T403 in the encryption key update management table T400' and the address shown in the journal top pointer field T205 in the journal volume management table T200 match with each other (Step 2607). In short, the controller 42b judges whether or not there is still a journal that has been encrypted with an old encryption key in the relevant read-source journal volume.

If it is judged that the address shown in the switch pointer field T403 in the encryption key update management table T400' and the address shown in the journal top pointer field T205 in the journal volume management table T200 do not match with each other, i.e., there is a journal that has been encrypted with the old encryption key in the relevant journal volume (step 2607: Yes), the controller 42b terminates the processing.

On the other hand, if it is judged that the address shown in the switch pointer field T403 in the encryption key update management table T400' and the address shown in the journal top pointer field T205 in the journal volume management table T200 match with each other, i.e., there is no journal that has been encrypted with the old encryption key in the relevant journal volume (Step 2607: No), the controller 42b sets "OFF" in the encryption key update status field in the relevant entry in the encryption key update management table T400' (Step 2608), deletes the encryption key that has been assigned to the old journal volume in the encryption management table T300 (Step 2605), and terminates the processing.

As described above, in this embodiment, when receiving an encryption key update command, the storage apparatus 4 sets the switch pointer to the storage area indicated by the journal end pointer, and decrypts journals that were stored before the switch pointer using an old decryption key, while decrypting journals that are stored after the switch pointer using a new encryption key. Accordingly, the encryption key used for a journal volume can be updated.

This invention can be widely applied in storage apparatuses equipped with a remote copy function.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system comprising:
   a first storage apparatus operatively connected to a host computer; and
   a second storage apparatus operatively connected to the first storage apparatus,
   wherein the first storage apparatus includes a first controller and a first disk drive controlled by the first controller, the first disk drive provided with a first data volume and a first journal volume,
   wherein the first controller includes a first encryption management table for managing an encryption status and an encryption key for each of the first data volume and the first journal volume,
   wherein when the first controller receives a write request from the host computer, the first controller:
      creates a journal based on data according to the write request,
      encrypts the created journal in accordance with the encryption status and the encryption key for the first journal volume that are managed by the first encryption management table,
      stores the encrypted journal in an area in the first journal volume,
      reads and decrypts the encrypted journal stored in the first journal volume, and
      transmits the decrypted journal to the second storage apparatus, and
   wherein when the first controller receives an encryption key update request for the first journal volume from a management apparatus connected to the first storage apparatus, the first controller secures a new journal volume and generates a new encryption key for the new journal volume.

2. The storage system according to claim 1, wherein the first controller encrypts the data according to the write request in accordance with the encryption status and the encryption key for the first data volume that are managed by the first encryption management table, and stores the encrypted data in the first data volume.

3. The storage system according to claim 2, wherein the first controller enters, in the first encryption management table, the new journal volume secured based on the encryption key update request and the new encryption key for the new journal volume.

4. The storage system according to claim 3, wherein the first controller includes a first journal volume management table for managing a storage location and a read location of a journal in a certain journal volume, and the first controller stores the journal in an area in the first journal volume or in the new journal volume based on the first journal volume management table.

5. The storage system according to claim 4, wherein the first controller:

enters a switch pointer for the first journal volume in the first encryption key update management table based on the encryption key update request;

decrypts the journal stored in the new journal volume based on the switch pointer; and transmits the decrypted journal to the second storage apparatus.

6. The storage system according to claim 4, wherein the first controller:

stores a switch control command in a certain area in the first journal volume for switching the certain area in the first journal volume to an area in the new journal volume based on the encryption key update request;

decrypts the journal stored in the new journal volume based on the switch control command after encryption of the journal stored in the first journal volume; and transmits the decrypted journal to the second storage apparatus.

7. The storage system according to claim 1, wherein the second storage apparatus includes a second controller and a second disk drive controlled by the second controller, wherein the second disk drive is provided with a second journal volume and a second data volume that is a paired volume of the first data volume in a pair relationship defined between the first data volume and the second data volume, wherein the second controller includes a second encryption management table for managing an encryption status and an encryption key for each of the second data volume and the second journal volume, and wherein the second controller encrypts a journal transmitted from the first controller in accordance with the encryption status and the encryption key for the second journal volume that are managed by the second encryption management table, and stores the encrypted journal in the second journal volume, the second controller storing encrypted journals in a particular order in the second journal volume.

8. The storage system according to claim 7, wherein the second controller:

decrypts the encrypted journals stored in the second journal volume in the particular order the encrypted journals were stored in the second journal volume, encrypts the decrypted data in accordance with the encryption status and the encryption key for the second data volume that are managed by the second encryption management table, and stores the encrypted data in the second data volume.

9. The storage system according to claim 7, wherein:

the second controller transmits a remote copy request to the first storage apparatus, and the first controller transmits the decrypted journal to the second storage apparatus based on the remote copy request.

10. The storage system according to claim 7, further comprising:

a management apparatus connected to the second storage apparatus, wherein the second controller secures, when receiving an encryption key update request for the first journal volume from the management apparatus, a new journal volume, and creates a new encryption key for the new journal volume.

11. The storage system according to claim 10, wherein the second controller further includes a second encryption key update management table for managing the encryption key update status of the second journal volume, and wherein the second controller updates the encryption key update status of the first journal volume in the first encryption key update management table based on the encryption key update request.

12. The storage system according to claim 11, wherein the first controller enters the new journal volume secured based on the encryption key update request and the new encryption key for the new journal volume in the second encryption management table.

13. The storage system according to claim 12, wherein the second controller includes a second journal volume management table for managing a storage location and a read location for a journal in a journal volume, and wherein the second controller stores the transmitted journal in an area in the second journal volume or in the new journal volume in accordance with the second journal volume management table.

14. A storage system, comprising:

a first storage apparatus operatively connected to a host computer; and a second apparatus operatively connected to the first storage apparatus, wherein the first storage apparatus includes a first controller and a first disk drive controlled by the first controller, the first disk drive provided with a first data volume and a first journal volume;

wherein the first controller includes a first encryption management table for managing an encryption status and an encryption key data for each of the first data volume and the first journal volume;

wherein the first controller includes a first encryption management table for managing an encryption status and an encryption key for each of the first data volume and the first journal volume;

wherein when the first controller receives a write request from the host computer, the first controller:

creates a journal based on data according to the write request;

encrypts the created journal in accordance with the encryption status and the encryption key for the first journal volume that are managed by the first encryption management table;

sequentially stores the encrypted journal in an area in the first journal volume;

sequentially reads and decrypts the encrypted journal stored in the first journal volume; and transmits the decrypted journal to the second storage apparatus; and wherein the first controller further includes a first encryption key update management table for managing an encryption key update status for the first journal volume, and the first controller updates the encryption key update status of the first journal volume in the first encryption key update management table based on the encryption key update request.

15. The storage system according to claim 14, wherein the first controller creates, when receiving an encryption key update request, a new encryption key, enters the created new encryption key in the encryption management table, and enters a switch pointer indicating a certain area in the first journal volume in the first encryption key update management table.

16. The storage system according to claim 14, wherein when the encryption key update status of the first journal volume in the first encryption key update management table is on, the first controller decrypts the journal stored in the first journal volume by using a new encryption key and transmits the decrypted journal to the second storage apparatus.

17. A method of managing data in a storage system that includes a first storage apparatus operatively connected to a host computer and a second storage apparatus operatively connected to the first storage apparatus, the method comprising:
- forming, under control of a first controller in the first storage apparatus, a first data volume and a first journal volume in a first disk drive;
- forming, under control of the first controller, when receiving a write request from a host computer, a journal based on data according to the write request;
- encrypting, under control of the first controller, the created journal based on an encryption status and an encryption key for the first journal volume that are managed by a first encryption management table, and storing the encrypted journal in the first journal volume, encrypted journals being stored in a particular order during that storage;
- decrypting, under control of the first controller, the journal that has been encrypted based on the encryption status and the encryption key for the first journal volume that are managed by the first encryption management table and that has been stored in the first journal volume;
- transmitting the decrypted journal to the second storage apparatus, the encrypted journals stored in the first volume being decrypted in the particular order during that decryption; and
- securing a new journal volume and generating a new encryption key for the new journal volume when receiving an encryption key update request for the first journal volume from a management apparatus connected to the first storage apparatus.

18. The method according to claim 17, further comprising:
- forming, under control of a second controller in the second storage apparatus, a second data volume that is a paired volume of the first data volume in a pair relationship defined between the first data volume and the second data volume and a second journal volume in a second disk drive; and
- encrypting, under control of the second controller, a journal transmitted from the first controller based on a second encryption management table for managing an encryption status and an encryption key for each of the second data volume and the second journal volume and storing the encrypted journal in the second journal volume.

* * * * *